US009217689B2

(12) United States Patent
Rollinger et al.

(10) Patent No.: US 9,217,689 B2
(45) Date of Patent: Dec. 22, 2015

(54) ENGINE COOLING SYSTEM CONTROL

(71) Applicant: Ford Global Technologies, LLC, Dearborn, MI (US)

(72) Inventors: John Eric Rollinger, Sterling Heights, MI (US); Robert Roy Jentz, Westland, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 165 days.

(21) Appl. No.: 14/166,752

(22) Filed: Jan. 28, 2014

(65) Prior Publication Data

US 2014/0144218 A1 May 29, 2014

Related U.S. Application Data

(63) Continuation of application No. 13/436,632, filed on Mar. 30, 2012, now Pat. No. 8,689,617.

(51) Int. Cl.
*G01M 15/04* (2006.01)
*F01P 7/04* (2006.01)
*F01P 7/10* (2006.01)
*F01P 7/16* (2006.01)

(52) U.S. Cl.
CPC .............. *G01M 15/048* (2013.01); *F01P 7/048* (2013.01); *F01P 7/10* (2013.01); *F01P 7/165* (2013.01); *F01P 2025/12* (2013.01); *F01P 2025/30* (2013.01); *F01P 2060/04* (2013.01); *F01P 2060/08* (2013.01); *F01P 2060/12* (2013.01)

(58) Field of Classification Search
CPC ...................................................... G01M 15/04
USPC ......................................................... 73/114.68
See application file for complete search history.

(56) References Cited

U.S. PATENT DOCUMENTS

| | | | |
|---|---|---|---|
| 5,598,705 A | 2/1997 | Uzkan |
| 5,724,924 A | 3/1998 | Michels |
| 6,234,399 B1 | 5/2001 | Leu |
| 6,240,774 B1 | 6/2001 | Niki et al. |
| 6,279,390 B1 | 8/2001 | Oka et al. |
| 6,321,696 B1 | 11/2001 | Nishioka et al. |
| 6,463,892 B1 | 10/2002 | Russell |
| 8,402,820 B2 | 3/2013 | Maier |
| 8,683,854 B2 | 4/2014 | Pursifull et al. |
| 2003/0217707 A1 | 11/2003 | Iwasaki |
| 2004/0035194 A1 | 2/2004 | Wakahara |
| 2004/0168510 A1 | 9/2004 | Wakahara et al. |
| 2004/0173012 A1 | 9/2004 | Tsukamoto et al. |
| 2004/0187805 A1 | 9/2004 | Arisawa et al. |
| 2004/0210361 A1 | 10/2004 | Na |
| 2004/0262411 A1 | 12/2004 | Tsukamoto et al. |
| 2005/0000473 A1 | 1/2005 | Ap et al. |
| 2005/0072385 A1 | 4/2005 | Kanno et al. |
| 2006/0149441 A1 | 7/2006 | Takamura |

(Continued)

*Primary Examiner* — Eric S McCall
(74) *Attorney, Agent, or Firm* — Julia Voutyras; Alleman Hall McCoy Russell & Tuttle LLP

(57) ABSTRACT

Methods and systems are provided for diagnosing each of a plurality of engine cooling system components including various valves and grill shutters. Each valve may be individually closed and opened for a specified duration, and corresponding changes in coolant temperature may be monitored. If all the components are functional, the various valves may be adjusted to stagnate coolant at the engine and expedite engine warm-up during a cold-start.

20 Claims, 10 Drawing Sheets

(56) References Cited

U.S. PATENT DOCUMENTS

| | | |
|---|---|---|
| 2007/0033998 A1 | 2/2007 | Wakahara et al. |
| 2007/0265135 A1 | 11/2007 | Ido |
| 2009/0114171 A1 | 5/2009 | Hayashi |
| 2010/0031646 A1 | 2/2010 | Iwase et al. |
| 2010/0095909 A1 | 4/2010 | Lin et al. |
| 2010/0116228 A1 | 5/2010 | Fujimoto |
| 2011/0120216 A1 | 5/2011 | Sugimoto |
| 2011/0137530 A1 | 6/2011 | Kerns |
| 2013/0255599 A1 | 10/2013 | Jentz et al. |
| 2013/0255605 A1 | 10/2013 | Jentz et al. |

ENGINE COOLING SYSTEM CONTROL

CROSS REFERENCE TO RELATED APPLICATIONS

The present application is a continuation of U.S. patent application Ser. No. 13/436,632, "ENGINE COOLING SYSTEM CONTROL," filed on Mar. 30, 2012, the entire contents of which are hereby incorporated by reference for all purposes.

TECHNICAL FIELD

The present application relates to methods and systems for diagnosing an engine cooling system.

BACKGROUND AND SUMMARY

Vehicles may include cooling systems configured to reduce overheating of an engine by transferring the heat to ambient air. Therein, coolant is circulated through the engine block to remove heat from the hot engine, and the heated coolant is then circulated through a radiator near the front of the vehicle. Heated coolant may also be circulated through a heat exchanger to heat a passenger compartment. The cooling system may include various components such as various valves and one or more thermostats.

As such, the various cooling system components may need to be periodically diagnosed. In some engine cooling systems, an opening of the various valves may be adjusted to thereby maintain different coolant temperatures in different regions of the coolant line. For example, the coolant temperature near an engine block can be maintained different from a coolant temperature near a thermostat, at least temporarily. The temperature differential may provide fuel economy and performance advantages during selected engine operating conditions. The inventors have recognized that in such cooling systems, if even one of the cooling system valves is degraded, it may not be clear whether an increase in coolant temperature in a region of the cooling system is due to the explicit change in valve positions or due to an unexpected overheating of an engine system component.

In one example, some of the above issues may be addressed by a method comprising, during an engine cold start, individually closing and opening each of a plurality of cooling system valves to stagnate a volume of coolant in a section of the cooling system while exposing a cooling system thermostat to a remaining volume of coolant; and diagnosing each of the plurality of valves based on a change in the coolant temperature sensed at the thermostat during the individual closing and opening. In this way, cooling system valve degradation may be determined based on various thermal differentials created in different regions of the cooling system.

For example, a cooling system may be configured to circulate coolant to various vehicle system components via a plurality of valves (including a bypass shut-off valve, a heater shut-off valve, a thermostat valve, a transmission cooling valve, a transmission heating valve, etc.). During an engine cold start, a heater shut-off valve may be closed for a first duration to stagnate coolant at the engine and expedite engine warm-up. Then, after the first duration, the heater shut-off valve may be opened to circulate the coolant at the cooling system thermostat following passage through a heater core. A coolant temperature may be monitored while the valve is closed and then after the valve is opened. As such, based on cabin heating demands, the coolant temperature post heater core may vary, and accordingly a coolant warm-up profile may vary. For example, after the valve is opened, a volume of relatively cooler coolant may be released into circulation, leading to a sudden drop in engine coolant temperature. Based on a change in coolant temperature sensed at the thermostat during the closing and opening of the heater shut-off valve, the heater shut-off valve's degradation may be determined. Specifically, the drop in coolant temperature may indicate that the heater shut-off valve is functional.

Likewise, following diagnosis of the heater shut-off valve, a bypass valve may be opened and closed and a change in coolant temperature over the closing and opening of the valve may be used to identify bypass shut-off valve degradation. Similar approaches may be used to identify degradation in transmission cooling or heating valves, as well as the functionality of a grill shutter system of the cooling system. In this way, by diagnosing each and every component of the cooling system, changes in coolant temperature resulting from valve degradation may be better distinguished from those caused by engine overheating. In addition, a variable and controllable coolant temperature may be achieved using the existing set of cooling system valves.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
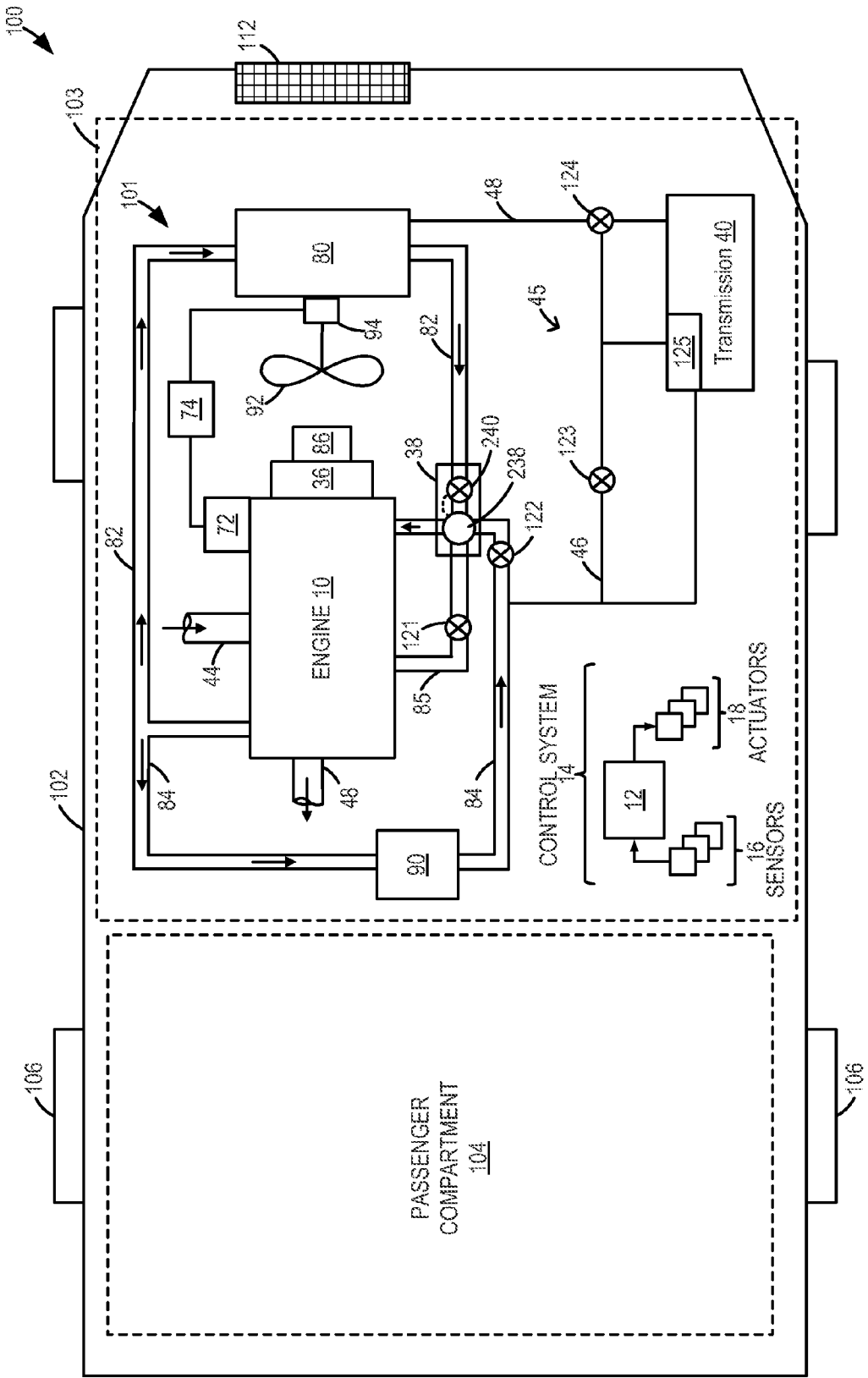
FIG. 1 shows a schematic diagram of a vehicle system including a cooling system according to an embodiment of the present disclosure.
Figure 9:
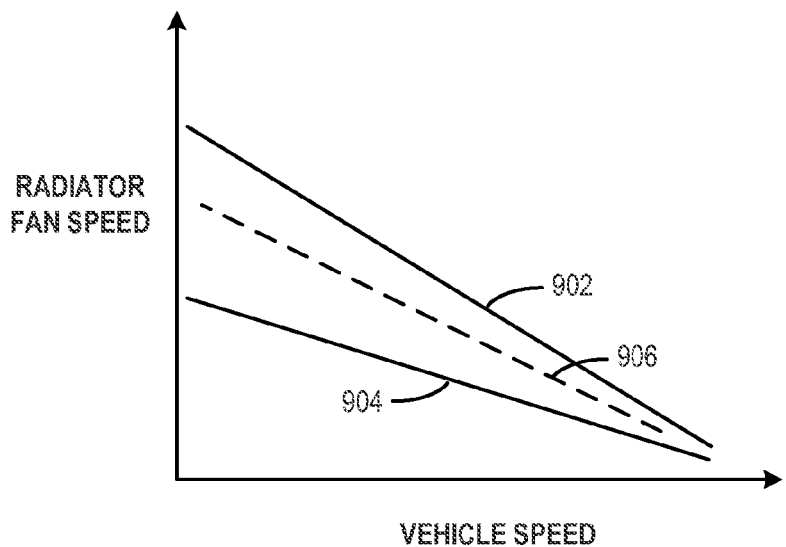
FIG. 9 shows an example thermal relationship map that may be used with the routine of FIG. 8 to diagnose grill shutter system degradation.
Figure 12:
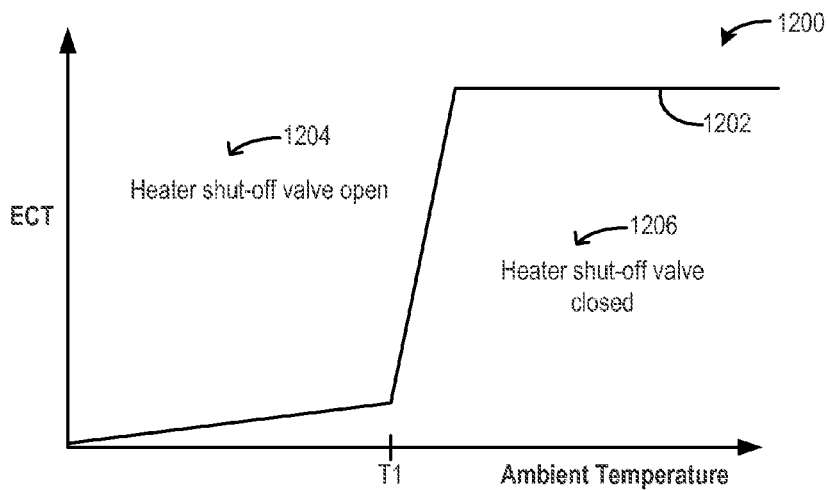
FIG. 12 shows an example thermal relationship map that may be used with the routine of FIG. 11 to determine whether to open or close the heater shut-off valve.

Methods and systems are provided for operating a cooling system (such as the cooling system of FIG. 1) coupled to an engine, transmission and passenger compartment of a vehicle system (such as the vehicle system of FIG. 1). Based on engine operating conditions, the position of one or more valves of the cooling system may be adjusted to thereby stagnate an amount of coolant in one region of the cooling system while circulating a remaining amount of coolant through a thermostat of the cooling system. By doing so, temperature differentials may be created at different regions of the cooling system to provide engine operating benefits. In addition, the same differentials may be used to diagnose various cooling system components. An engine controller may be configured to perform control routines, such as the routine of FIG. 3, to adjust the position of the various valves during an engine cold start to stagnate coolant at the engine, thereby expediting warm-up of the coolant in closest communication with a combustion chamber. The controller may also adjust the various valves to perform diagnostic routines, such as those shown in FIGS. 4, 6-8, and 10. Example thermal relationship maps that may be used to assist in diagnosing the various cooling system components are shown at FIGS. 5 and 9. The controller may also perform a control routine, such as the routine of FIG. 11, with assistance from a thermal map, such as the map of FIG. 12, to determine when to open a valve of the cooling system based on engine operating conditions. By varying an amount of coolant that is stagnated at an engine block, fuel economy and engine performance benefits may be achieved.

FIG. 1 shows an example embodiment of a vehicle system 100 including a vehicle cooling system 101 in a motor vehicle 102. Vehicle 102 has drive wheels 106, a passenger compartment 104 (herein also referred to as a passenger cabin), and an under-hood compartment 103. Under-hood compartment 103 may house various under-hood components under the hood (not shown) of motor vehicle 102. For example, under-hood compartment 103 may house internal combustion engine 10. Internal combustion engine 10 has a combustion chamber which may receive intake air via intake passage 44 and may exhaust combustion gases via exhaust passage 48. Engine 10 as illustrated and described herein may be included in a vehicle such as a road automobile, among other types of vehicles. While the example applications of engine 10 will be described with reference to a vehicle, it should be appreciated that various types of engines and vehicle propulsion systems may be used, including passenger cars, trucks, etc.

Under-hood compartment 103 may further include cooling system 101 that circulates coolant through internal combustion engine 10 to absorb waste heat, and distributes the heated coolant to radiator 80 and/or heater core 90 via coolant lines (or loops) 82 and 84, respectively. In one example, as depicted, cooling system 101 may be coupled to engine 10 and may circulate engine coolant from engine 10 to radiator 80 via engine-driven water pump 86, and back to engine 10 via coolant line 82. Engine-driven water pump 86 may be coupled to the engine via front end accessory drive (FEAD) 36, and rotated proportionally to engine speed via a belt, chain, etc. Specifically, engine-driven pump 86 may circulate coolant through passages in the engine block, head, etc., to absorb engine heat, which is then transferred via the radiator 80 to ambient air. In one example, where pump 86 is a centrifugal pump, the pressure (and resulting flow) produced by the pump may be increased with increasing crankshaft speed, which in the example of FIG. 1, may be directly linked to the engine speed. In some examples, engine-driven pump 86 may operate to circulate the coolant through both coolant lines 82 and 84.

The temperature of the coolant may be regulated by a thermostat 38. Thermostat 38 may include a temperature sensing element 238, located at the junction of cooling lines 82, 85, and 84. Further, thermostat 38 may include a thermostat valve 240 located in cooling line 82. As elaborated in further detail at FIG. 2, the thermostat valve may remain closed until the coolant reaches a threshold temperature, thereby limiting coolant flow through the radiator until the threshold temperature is reached.

Coolant may flow through coolant line 84 to heater core 90 where the heat may be transferred to passenger compartment 104. Then, coolant flows back to engine 10 through valve 122. Specifically, heater core 90, which is configured as a water-to-air heat exchanger, may exchange heat with the circulating coolant and transfer the heat to the vehicle passenger compartment 104 based in operator heating demands. As such, heater core may also be coupled to a vehicle HVAC system (or heating, ventilation, and air conditioning system) that includes other components such as a heater fan, and an air conditioner (not shown). Based on a cabin heating/cooling request received from the operator, the HVAC system may warm cabin air using the heated coolant at the heater core to raise cabin temperatures and provide cabin heating. In general, the heat priority may include cabin heating demands being met first, followed by combustion chamber heating demands being met, followed by powertrain fluid/lubricant heating demands being met. However, various conditions may alter this general priority. Ideally, no heating would be rejected by the radiator until all the above components are at full operating temperature. As such, heat exchanger limits reduce the efficiency of the system.

Coolant may also circulate from engine 10 towards thermostat 38 upon passage through a first bypass loop 85 via a first bypass shut-off valve 121. As elaborated herein with reference to FIGS. 2-3, during selected conditions, such as during an engine cold-start condition, bypass shut-off valve 121 may be closed to stagnate a (small) amount of coolant in bypass loop 85, at the engine block and cylinder heads. By isolating coolant at the engine block, coolant flow past the thermostat's temperature sensing element 238 may be prevented, thus delaying opening of the thermostatic valve 240 allowing flow to the radiator. In other words, coolant circulation is enabled in first bypass loop 85 when thermostat valve 240 is closed, bypass shut-off valve 121 is closed, and the coolant pump speed is high. This coolant circulation limits the coolant pressure and pump cavitation. Overall, engine warm-up may be expedited by reducing flow to thermal losses outside the engine and by preventing the temperature sensing element 238 from seeing hot coolant flow from the engine. Coolant may be circulated from heater core 90 towards thermostat 38 via heater shut-off valve 122. During engine cold-start conditions, heater shut-off valve may also be closed to stagnate a small amount of coolant in cooling line (or loop) 84. This also allows coolant to be stagnated at the engine block, heater core, and cylinder heads, further assisting in engine and transmission warm-up. Further details regarding the operation of the various valves and components of cooling system 101 are elaborated at FIG. 2.

It will be appreciated that while the above example shows stagnating coolant at the engine by adjusting a position of one or more valves, in alternate embodiments, such as when using an electrically-driven coolant/heatant pump, coolant stagnation at the engine may also be achieved by controlling the pump speed to zero.

One or more blowers (not shown) and cooling fans may be included in cooling system 101 to provide airflow assistance and augment a cooling airflow through the under-hood components. For example, cooling fan 92, coupled to radiator 80, may be operated to provide cooling airflow assistance through radiator 80. Cooling fan 92 may draw a cooling airflow into under-hood compartment 103 through an opening in the front-end of vehicle 102, for example, through grill shutter system 112. Such a cooling air flow may then be utilized by radiator 80 and other under-hood components (e.g., fuel system components, batteries, etc.) to keep the engine and/or transmission cool. Further, the air flow may be used to reject heat from a vehicle air conditioning system. Further still, the airflow may be used to improve the performance of a turbocharged/supercharged engine that is equipped with intercoolers that reduce the temperature of the air that goes into the intake manifold/engine. In one example, grill shutter system 112 may be configured with a plurality of louvers (or fins, blades, or shutters) wherein a controller may adjust a position of the louvers to control an airflow through the grill shutter system.

Cooling fan 92 may be coupled to, and driven by, engine 10, via alternator 72 and system battery 74. Cooling fan 92 may also be mechanically coupled to engine 10 via an optional clutch (not shown). During engine operation, the engine generated torque may be transmitted to alternator 72 along a drive shaft (not shown). The generate torque may be used by alternator 72 to generate electrical power, which may be stored in an electrical energy storage device, such as system battery 74. Battery 74 may then be used to operate an electric cooling fan motor 94.

Vehicle system 100 may further include a transmission 40 for transmitting the power generated at engine 10 to vehicle wheels 106. Transmission 40, including various gears and clutches, may be configured to reduce the high rotational speed of the engine to a lower rotational speed of the wheel, while increasing torque in the process. To enable temperature regulation of the various transmission components, cooling system 101 may also be communicatively coupled to a transmission cooling system 45. The transmission cooling system 45 includes a transmission oil cooler 125 (or oil-to-water transmission heat exchanger) located internal or integral to the transmission 40, for example, in the transmission sump area at a location below and/or offset from the transmission rotating elements. Transmission oil cooler 125 may have a plurality of plate or fin members for maximum heat transfer purposes. Coolant from coolant line 84 may communicate with transmission oil cooler 125 via conduit 46 and transmission warming valve 123. Specifically, transmission warming valve 123 may be opened to receive heated coolant from coolant line 84 to warm transmission 40. In comparison, coolant from coolant line 82 and radiator 80 may communicate with transmission oil cooler 125 via conduit 48 and transmission cooling valve 124. Specifically, transmission cooling valve 124 may be opened to receive cooled coolant from radiator 80 for cooling transmission 40.

FIG. 1 further shows a control system 14. Control system 14 may be communicatively coupled to various components of engine 10 to carry out the control routines and actions described herein. For example, as shown in FIG. 1, control system 14 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 16, which may include user inputs and/or sensors (such as transmission gear position, gas pedal input, brake input, transmission selector position, vehicle speed, engine speed, mass airflow through the engine, ambient temperature, intake air temperature, etc.), cooling system sensors (such as coolant temperature, cylinder heat temperature, fan speed, passenger compartment temperature, ambient humidity, thermostat output, etc.), and others. Further, controller 12 may communicate with various actuators 18, which may include engine actuators (such as fuel injectors, an electronically controlled intake air throttle plate, spark plugs, etc.), cooling system actuators (such as the various valves of the cooling system), and others. In some examples, the storage medium may be programmed with computer readable data representing instructions executable by the processor for performing the methods described below as well as other variants that are anticipated but not specifically listed.

Figure 2:
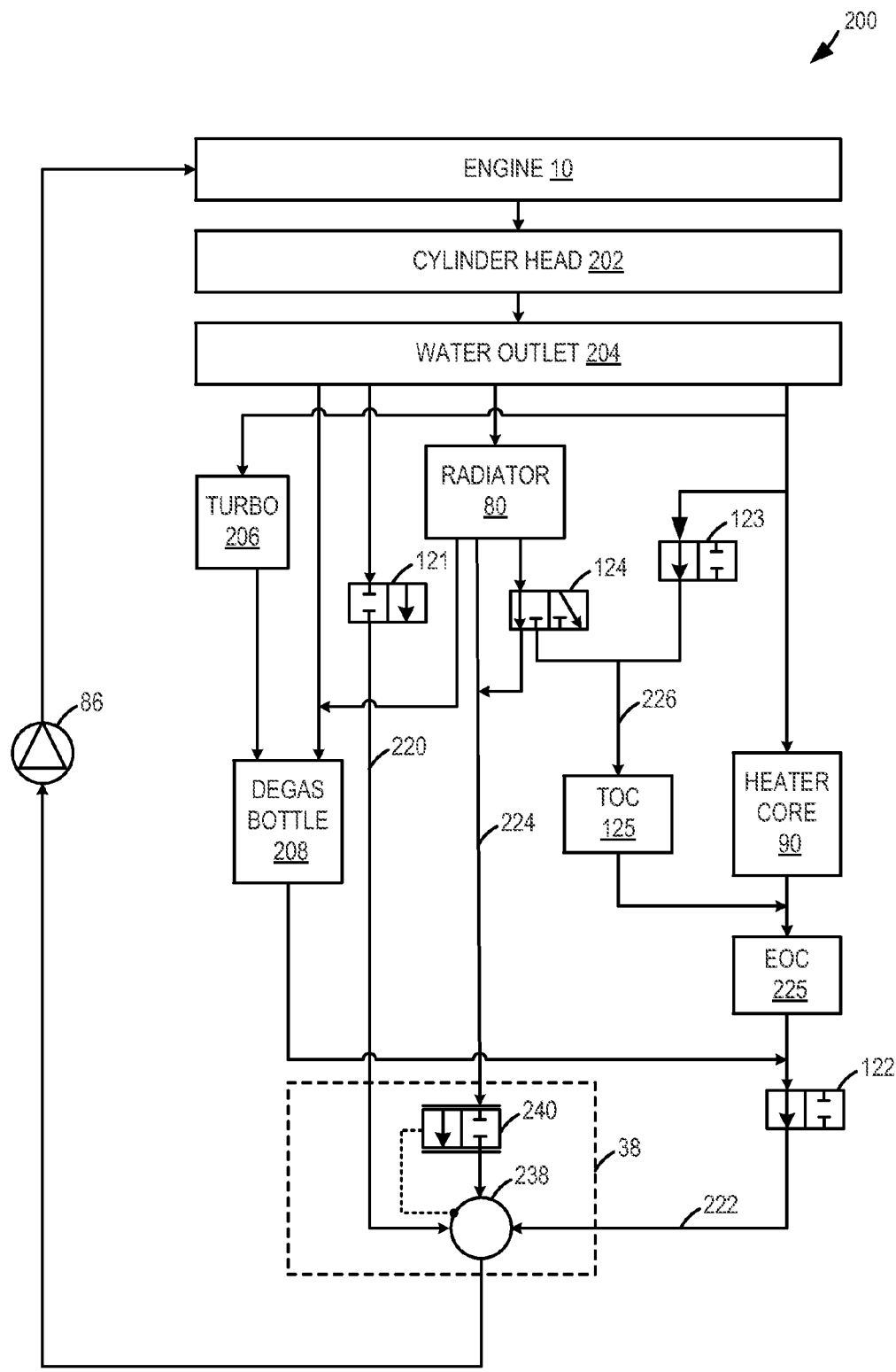
FIG. 2 shows an example embodiment of the cooling system of FIG. 1.

Now turning to FIG. 2, it shows an example embodiment 200 of the cooling system of FIG. 1 with the various valves, loops, and heat exchangers. Coolant may be circulated at thermostat 38 from various loops. As such, thermostat 38 is configured with a temperature sensing element 238 for estimating a temperature of coolant circulating at the thermostat, while thermostat valve 240, communicatively coupled to the temperature sensing element, is configured to open only when the temperature is above a threshold. In one example, thermostat valve 240 may be a mechanically actuated valve, such as a wax plug for the actuation force/displacement, that opens when coolant sensed at the temperature sensing element (the wax) is above the threshold temperature.

Coolant may circulate along a first bypass loop 220 from engine 10 towards thermostat 38. From there, the coolant may be pumped back to the engine by pump 86. First bypass loop 220 includes a first bypass shut-off valve 121. Coolant may also circulate along a second heater loop 222 from engine 10 via heater core 90 and engine oil cooler 225 towards thermostat 38. From there, the coolant may be pumped back to the engine by pump 86. Second heater loop includes a second heater shut-off valve 122. Coolant may also circulate from engine 10, through radiator 80, via third loop 224, to thermostat 38, based on the state of the thermostat valve 240. Specifically, when thermostat valve 240 is open, coolant may circulate though radiator 80, and then through thermostat valve 240. The flow of coolant through the radiator may allow heat from the circulating hot coolant to be dissipated to the ambient air by the radiator fan. After flowing through the thermostat valve, coolant may be pumped back towards the engine by pump 86.

One or more temperature sensors may be coupled to the cooling system, at the engine hot water outlet, to estimate a coolant temperature. For example, coolant temperature may be estimated by an engine coolant temperature (ECT) sensor positioned to be in contact with the heated coolant. Alternatively, coolant temperature may be estimated by a cylinder head temperature (CHT) sensor positioned on the engine block, for example, positioned a few millimenters of aluminum away from the flowing engine coolant in the cylinder head.

As such, thermostat valve 240 may be open during conditions when a temperature of coolant circulating at temperature sensing element 238 is higher than a threshold temperature. This circulating coolant may have come from one or more of first bypass loop 220 and second heater loop 222. Thus, a temperature of coolant circulating at the thermostat is affected by the temperature of the engine (that is, an amount of heat transferred from the engine to the coolant) as well as an amount of cabin heating requested (that is, an amount of heat withdrawn from the coolant at the heater core to heat the passenger compartment). As elaborated at FIG. 3, by varying a position of the heater shut-off valve and the bypass shut-off valve, a ratio of coolant circulating at the thermostat that is from the engine relative to coolant that is from the heater core may be varied, thereby changing a temperature of coolant at the thermostat, and accordingly, a regulated coolant temperature.

In comparison, when thermostat valve 240 is closed, substantially no flow of coolant through radiator 80 may be possible. In the absence of coolant flow through the radiator, no heat may be dissipated to the ambient air via the radiator fans. As such, thermostat valve 240 may be closed during conditions when a temperature of coolant circulating at temperature sensing element 238 is lower than the threshold temperature, wherein the circulating coolant comes from one or more of first bypass loop 220 and second heater loop 222.

Coolant may also be circulated through various transmission temperature controlling valves to thereby either cool or warm a transmission (such as transmission 40 of FIG. 1). For example, cooled coolant may flow from radiator 80 through transmission cooling valve 124 to transmission oil cooler 125 to cool the transmission. If the thermostat valve is open, cooled coolant may be returned to the third loop 224 from where the coolant may be pumped back to the engine via pump 86. Alternatively, if the thermostat is closed, cooled coolant may be configured to exchange heat at transmission oil cooler (TOC) 125, and engine oil cooler (EOC) 225, and then be returned to second loop 222. From there, the coolant may be being pumped back to the engine via pump 86.

When transmission heating is required, heated coolant from second loop 222 may be circulated through transmission warming valve 123 to transmission oil cooler 125 to warm the transmission. From there, coolant may be returned to second loop 222 at a location upstream of engine oil cooler 225 and heater shut-off valve 122. From there, the coolant may be being pumped back to the engine via pump 86. Likewise, in vehicle systems configured with boosting devices, such as a turbocharger 206, a portion of coolant may be circulated from heater loop 222 through a housing of the turbocharger 206 to enable cooling of the boosting device. After passage through the turbocharger, the coolant may be degassed upon passage through degassing bottle 208. The degassed and heated coolant may then be returned to second heater loop 222, upstream of heater shut-off valve 122. From there, the coolant may be being pumped back to the engine via pump 86.

The inventors herein have recognized that by adjusting a position of the various valves of the cooling system, coolant in different regions or loops of the cooling system may be maintained, at least temporarily, at different coolant temperatures. By varying the temperature of coolant circulating at the thermostat, an opening state of the thermostat valve may then be controlled, which in turn controls flow of coolant through the radiator. Various advantages may be achieved by this configuration.

For example, if only valve 121 is opened, the thermostat sees the warmest coolant and the radiator valve opens soonest during a warm-up. As such, this may be advantageous during conditions of hot ambient temperatures. In comparison, if valve 240 is closed, the radiator valve tends to stay closed because valve 240 prevents the warm coolant from impinging on temperature sensing element 238. In further comparison, the coolant flowing from valve 122 is not as hot as the coolant flowing from valve 220 and therefore has an effect between the other two.

Additional examples are discussed herein. For example, as elaborated at FIG. 3, coolant may be stagnated at the engine to allow a coolant temperature at the engine to be raised, while the temperature of coolant circulating at the thermostat may be kept lower. Effectively, a behavior similar to that of a more costly and complicated variable thermostat is achieved, and accordingly, the benefits associated with a variable coolant regulating temperature ensue. Thus, even though the coolant temperature at the engine is higher, by keeping the thermostat valve closed, coolant flow through the radiator (and therefore heat loss across the radiator) may be temporarily disabled. By further adjusting a position of the various valves, the heated coolant may then be directed towards vehicle components requiring heat (e.g., towards a transmission requiring transmission heating for optimal function, towards a heater core for directing heat towards a passenger cabin, etc.), while still keeping heat loss through the radiator disabled. Then, when all the components have been sufficiently heated, a position of the various cooling system valves may be further adjusted to circulate heated coolant at the thermostat (in particular, the temperature sensing element 238), thereby causing thermostat valve 240 to open, and coolant flow through the radiator to be enabled.

As an example, during engine cold start conditions, one or more of the first bypass shut-off valve and the second heater shut-off valve (e.g., each of the first bypass shut-off valve and the second heater shut-off valve) coupled between the first and second loop of the cooling system may be adjusted (e.g., actuated closed) to stagnate an amount of coolant at the engine block (e.g., in the first loop upstream of the first valve and in the second loop upstream of the second valve) and raise a first coolant temperature at the engine block in the first loop above a second coolant temperature of a remaining amount of coolant circulating at the thermostat.

Then, after the engine has been sufficiently warmed, one or more of the bypass shut-off valve and the second heater shut-off valve may be actuated open to allow the previously stagnating, and now heated, coolant to reach the thermostat. For example, after the engine has been sufficiently warmed, in response to a request for transmission warming (for improved engine performance), only the bypass shut-off valve may be closed while the heater shut-off valve is maintained open. As a result, heated coolant stagnating in the second loop may be circulated through the transmission warming valve to warm the transmission. At the same time, heated coolant previously stagnating in the first loop may be flown through the thermostat, but since the coolant temperature may not be hot enough to open the thermostat valve, no coolant may flow through the radiator. As a result, the heated coolant may be advantageously used to expedite engine and transmission warming, and no heat may be wastefully dissipated to the environment.

As another example, in response to a request for increased cabin heating, the bypass shut-off valve may be opened while the transmission warming valve is closed and the heater shut-off valve is opened. As a result, heated coolant stagnating in the second loop may be circulated through the heater core to warm the passenger cabin. At the same time, heated coolant previously stagnating in the first loop may be circulated through the thermostat, but since the coolant temperature may not be hot enough to open the thermostat valve, no coolant may flow through the radiator. As a result, the heated coolant may be advantageously used to heat the cabin, and no heat may be wastefully dissipated to the environment.

As another example, after the engine and transmission and/or vehicle cabin have been sufficiently warmed, each of the bypass shut-off valve and the heater shut-off valve may be opened. As a result, heated coolant stagnating in each of the first and second loops may be circulated through the thermostat, and the coolant temperature may be hot enough to open the thermostat valve. Then, the heated coolant may flow through the radiator, and the excess heat may be dissipated to the environment. In an ideal case setting, no heat would be rejected to the environment until all elements are fully heated.

In practicality, the heat transfer rates to engine oil or transmission fluid may require some radiator flow before all elements are fully warmed.

It will be appreciated that while stagnating coolant at the engine for any duration, a controller may be configured to intermittently opening the first bypass shut-off valve in response to a pressure in the first coolant loop (or at the engine block) rising above a threshold pressure. In this way, the bypass shut-off valve may be used for pressure relief.

Figure 3:
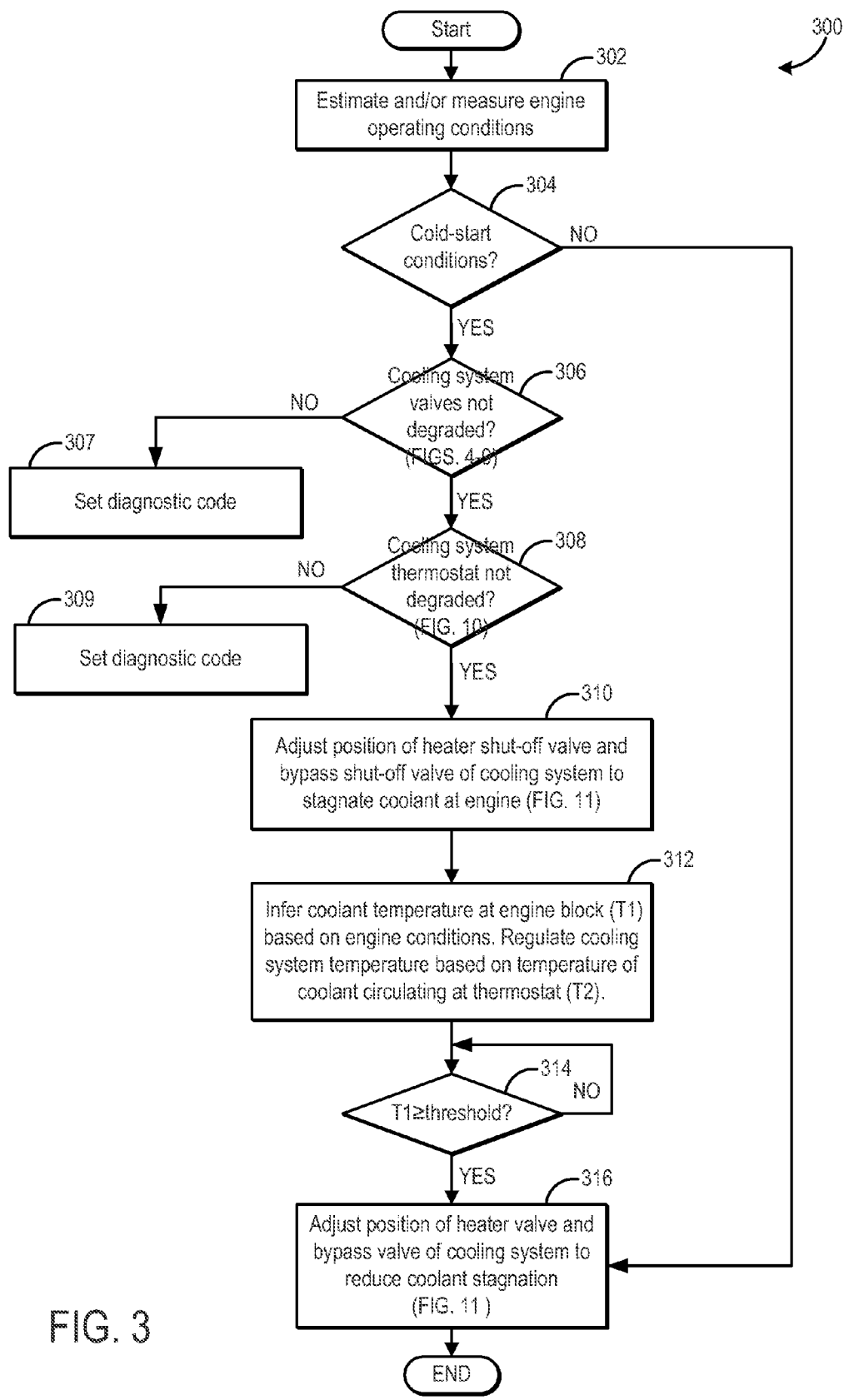
FIG. 3 shows a high level flow chart for operating the cooling system of FIGS. 1-2 to stagnate an amount of coolant at the engine.
Figure 10:
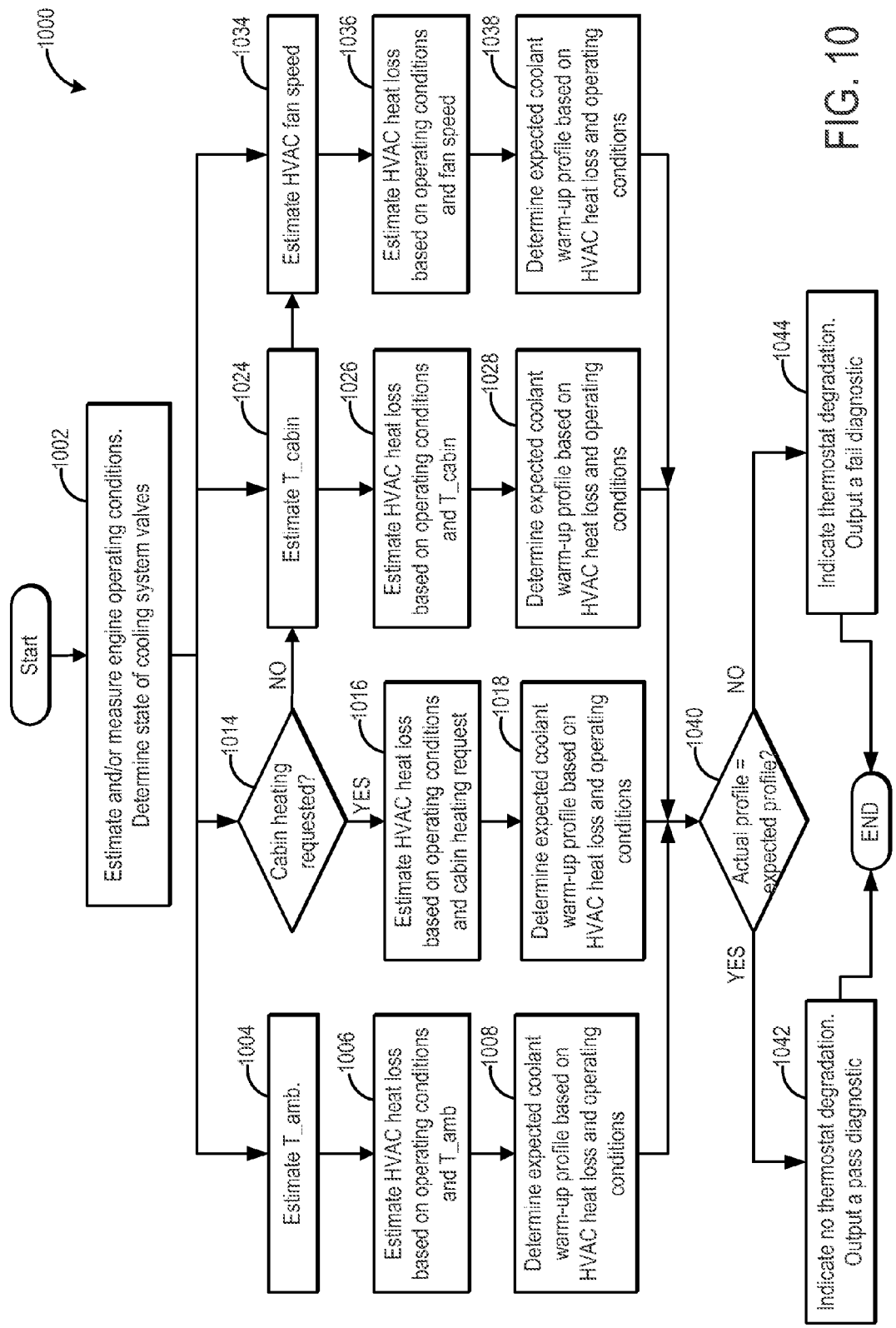
FIG. 10 shows a high level flow chart for diagnosing a thermostat of the cooling system.
Figure 11:
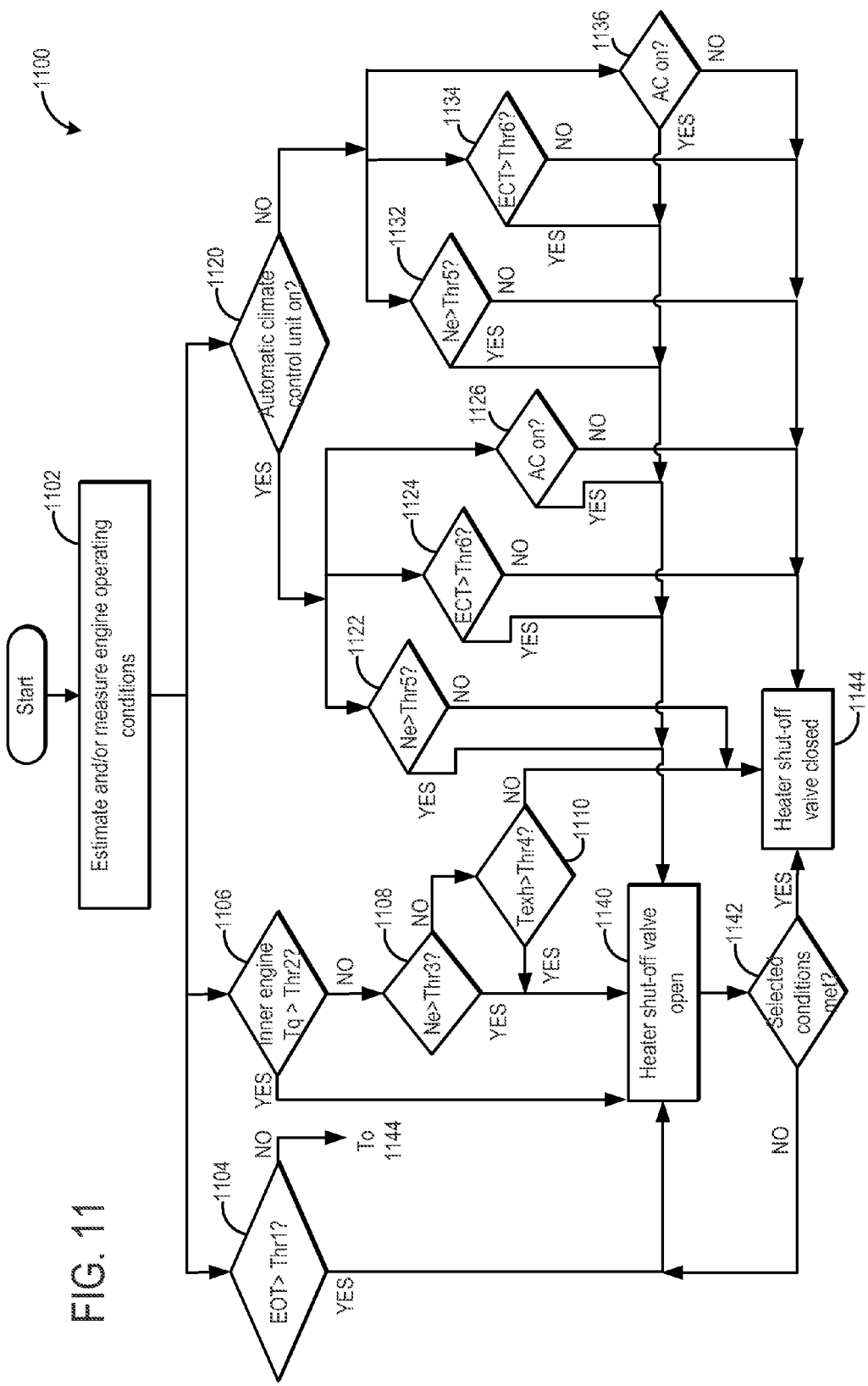
FIG. 11 shows a high level flow chart for adjusting an opening of the heater shut-off valve based on various engine operating conditions.

Adjusting the positions of the various valves is further elaborated herein with reference to FIGS. 3 and 11. As such, prior to adjusting a position of the valves, an engine controller may perform diagnostic routines to confirm the functionality of the various valves. As elaborated at FIGS. 4-10, the diagnostic routines may also take advantage of the fact that varying temperature differentials may be generated at different regions/loops of the cooling system by varying the state of one or more cooling system valves. Thus, by varying the position of the valves and comparing an observed coolant temperature trend with an expected trend, valve degradation can be determined.

Now turning to FIG. 3, an example method 300 is shown for adjusting a position of the plurality of valves of the cooling system of FIG. 2 so as to vary an amount of coolant that is stagnated at the engine while a remaining amount is circulated. In doing so, a coolant temperature that impinges the thermostat valve can be varied. Since the thermostat valve is regulated to limit a coolant temperature, by adjusting the various cooling system valves, a variable and controllable engine coolant temperature of coolant circulated at the thermostat can be achieved. A position of the plurality of valves may be adjusted upon confirming that each of the valves is functioning as expected. Accordingly, various diagnostic routines may be performed to confirm the functionality of each of the cooling system components based on thermal differentials created at different regions or loops of the cooling system.

At 302, engine operating conditions may be estimated and/or measured. These may include, for example, engine speed, engine temperature, coolant temperature, catalyst temperature, ambient conditions (e.g., ambient temperature, pressure, humidity), cabin heating demands, torque demands, vehicle speed, radiator fan speed, etc. At 304, engine cold-start conditions may be confirmed. These may include, for example, an exhaust catalyst temperature being lower than a light-off temperature and/or a threshold duration having elapsed since a previous engine start, an engine coolant or metal temperature below a threshold, etc.

If engine cold-start conditions are not confirmed, for example, if the exhaust catalyst is already sufficiently warmed, then the method may proceed to 316 to adjust the position of the various cooling system valves based on the prevalent engine operating conditions, as elaborated at FIG. 11.

This may include, for example, keeping the bypass shut-off valve open to allow the thermostat to keep the regulating temperature. Alternatively, to regulate a water outlet temperature, ECT (or CHT) may be measured and the bypass shut-off valve may be opened when the water would otherwise be too hot.

If an engine cold-start condition is confirmed, then at 306, it may be confirmed that the cooling system valves are not degraded. As elaborated at FIGS. 4-9, various diagnostic routines may be performed to diagnose a condition of the various cooling system valves. For example, the valves may be sequentially (and individually) opened and closed for a duration, and valve degradation may be determined based on a change in coolant temperature over the duration of opening and closing. The various valves diagnosed may include, for example, the heater shut-off valve, the bypass shut-off valve, and the transmission cooling valve. If any of the valves is diagnosed to be non-functional, then at 307, valve degradation may be indicated by setting a diagnostic code. For example, Diagnostic Trouble Codes (DTCs) may be set. In some embodiments, further mitigating actions may be taken. For example, if the bypass shut-off valve is determined to be stuck closed, the heater shut-off valve may be opened, and vice versa. As another example, if the transmission heating valve is determined to be stuck open, the transmission cooling valve may be opened to counter-act it, and vice versa. As a further example, if both the bypass shut-off valve and the heater shut-off valve are stuck closed, engine speed may be limited. Further still, if engine coolant temperature (ECT) or cylinder head temperature (CHT) starts climbing past a threshold, the engine may be cooled internally with air via rotating injector cutout.

Upon confirming that the various cooling system valves are working, the routine proceeds to 308 where it may be confirmed that the cooling system thermostat is not degraded. This may include confirming that the thermostat valve is not degraded and/or the temperature sensing element of the thermostat is not degraded. As elaborated at FIG. 10, various diagnostic routines may be performed to diagnose a condition of the cooling system thermostat. If the thermostat is diagnosed to be non-functional, then at 309, thermostat degradation may be indicated by setting a diagnostic code, such as a Diagnostic Trouble Code. In some embodiments, further mitigating actions may be taken. For example, if it is determined that the thermostat valve is stuck open, nothing may be done. However, if it is determined that the thermostat valve is stuck closed, the engine may be internally cooled with air via rotating injector cutout.

Next at 310, responsive to the engine cold-start condition, a position of each of the bypass shut-off valve and the heater shut-off valve may be adjusted to stagnate a volume of coolant (e.g., a first amount of coolant) at the engine block while circulating a remaining volume of coolant (e.g., a second amount of coolant) at a thermostat of the cooling system. As such, if the vehicle operator has not requested cabin heating, coolant may be advantageously stagnated at the engine until the engine coolant temperature (ECT) sensed by the ECT sensor is at or slightly above a threshold (e.g., near boiling). Then, hot coolant may be released from the hot water outlet. Once the ECT has reached the threshold temperature, hot coolant may be flown into the transmission heater. To heat the transmission, transmission warming valve 123 and heater shut-off valve 122 may be opened. Once the transmission is up to a desired temperature, or if the ECT is above a threshold, the bypass shut-off valve is opened to allow the very hot coolant to impinge on the thermostat's temperature sensing element, thereby allowing the thermostat valve to open and coolant flow through the radiator to ensue. Thus, heat from hot coolant may be provided to the various engine system components in the following order of heat priority: 1) to the HVAC first, if the vehicle operator is calling for cabin heating, 2) to the cylinder head to warm up the engine and 3) finally to the transmission. Once all the engine components have attained the desired temperatures (or temperature ranges), and if the coolant temperature is still above a threshold, the excess heat may be dissipated to the ambient via the radiator.

Example adjustments are now elaborated. For example, the first amount of coolant may be stagnated in a first bypass loop of the cooling system, while the second amount of coolant is circulated in a second heater loop of the cooling system (the second loop including a heater core upstream of the thermostat). Valve adjustments may include, for example, closing the heater shut-off valve while the bypass shut-off valve is opened, closing the bypass shut-off valve while the heater shut-off valve is opened, or closing each of the heater and bypass shut-off valves. As elaborated herein, and at FIG. 11, by closing one or more of the bypass and heater shut-off valves, coolant may be isolated at the engine block and/or heater core, and may be unable to circulate through the radiator. As a result, the smaller volume of stagnated coolant can be rapidly warmed via heat generated at the engine block and/or cylinder head. By not removing the heat from the region surrounding the engine block, as would be expected, the local temperature can be rapidly, and temporarily, raised so as to expedite engine and/or transmission warming during the cold-start condition. Example adjustments to the position of the heater shut-off valve based on various engine operating conditions (e.g., engine speed, cabin heating request, torque, etc.) is illustrated herein at FIG. 11.

It will be appreciated that while stagnating coolant at the engine for any duration, a controller may be configured to intermittently opening the first bypass shut-off valve in response to a pressure in the first coolant loop (or at the engine block) rising above a threshold pressure. In this way, the bypass shut-off valve may also be used for pressure relief.

At 312, the controller may infer a coolant temperature at the engine block or cylinder head (T1) based on engine conditions while regulating a temperature of coolant in the cooling system based on a temperature of coolant (T2) circulating at the thermostat. For example, while coolant is stagnated at the engine block, a temperature of engine coolant circulating at the thermostat (T2) may be measured or sensed by a temperature sensing element of the thermostat, or a temperature sensor positioned in cooling system near the thermostat (e.g., a temperature sensor at the radiator outlet or in the cylinder head). At the same time, a temperature of coolant stagnating at the engine block (T1) may be estimated based on vehicle speed, radiator fan speed, ambient temperature (T_amb), and a coolant temperature at the thermostat (T2). Alternatively, the coolant temperature may be estimated from an expected ECT versus time curve which is based on an initial ECT estimate and an integration of an engine fuel consumption rate. This is because roughly 20% of the fuel energy goes into the coolant.

The heater and bypass shut-off valves may be maintained in the selected states to stagnate coolant at the engine block for a duration until the coolant temperature at the engine block (T1) is above a threshold. This threshold may correspond to a temperature above which engine cold-start conditions may not be confirmed. Thus, at 314, it may be determined if the coolant temperature at the engine block (as inferred at 312) is higher than the threshold. Upon confirmation, at 316, the position of the various cooling system valves, including the heater and bypass shut-off valves may be adjusted. For example, the heater shut-off valve 122 may be opened once the engine coolant temperature (as sensed by the ECT or CHT sensor) is hot (e.g., above a threshold temperature). As such, if the heater shut-off valve is open, there may be no need to open the bypass shut-off valve 121 as long as the engine coolant temperature (ECT) is below the threshold temperature. Specifically, the bypass shut-off valve may be opened only if the ECT is below a threshold temperature, the operator is not calling for cabin heating to be provided, and the engine speed is sufficiently high (e.g., above a threshold speed). That is, the normally closed bypass shut-off valve is opened to assist in relieving pressure if the pump speed is high while the heater shut-off valve is closed. During selected conditions, the bypass shut-off valve can also be opened to lower the ECT. As also elaborated at FIG. 11, a position of the heater shut-off valve may also be adjusted based on various engine operating conditions (e.g., engine speed, cabin heating request, torque, etc.) to reduce coolant stagnation at the engine and increase coolant circulation though the radiator.

As a first example, during the engine cold-start condition, the controller may close the bypass shut-off valve and open the heater shut-off valve to increase the first amount of coolant stagnated at the engine block relative to the second amount of coolant circulated at the thermostat. The adjusting may be performed for a duration so as to raise a first coolant temperature of the first amount of stagnated coolant (at the engine block and cylinder head) above a threshold temperature (e.g., an exhaust catalyst light-off temperature), while a second coolant temperature of the second amount of coolant is maintained below the threshold temperature over the duration. Herein, the duration may be based on an engine speed, a torque demand, and a vehicle cabin heating request.

As such, when the bypass shut-off valve is closed and the heater shut-off valve is open, the thermostat sees oil cooler outlet temperature and regulates to a given temperature setting. The coolant temperature in the cylinder head and engine block becomes dependent on the temperature loss across the heater core, transmission oil cooler, and engine oil cooler. As such, the greater the temperature loss, the higher the cylinder head temperature is above the thermostat setting. Using the coolant temperature, cabin heater fan speed, cabin temperature, transmission warming valve position, and transmission oil temperature, this heat loss can be estimated. Thus, while the first bypass shut-off valve is closed, the second coolant temperature may be estimated by a temperature sensor at the thermostat, while the first coolant temperature may be inferred based on each of a radiator fan speed, a vehicle speed, an ambient air temperature and the estimated second coolant temperature. Alternatively, ECT (or CHT) may be directly measured at the engine hot water outlet (or cylinder head). That is, ECT inference is used to prove that all the cooling system valves are in the positions to which they are controlled. Then, after the duration has elapsed, the controller may open the bypass valve while maintaining the heater valve open so that the first amount of coolant is now also circulated at the thermostat.

In an alternate example, the bypass shut-off valve may be opened while the heater shut-off valve is closed. Now, the thermostat sees a radiator outlet temperature and regulates to a given temperature setting. The coolant temperature in the cylinder head and engine block becomes dependent on the temperature loss across the radiator.

As such, since the opening of the thermostat valve is affected by the temperature of coolant circulating at the thermostat, by varying the amount of coolant stagnated in the first and second loops, the temperature affected at the thermostat may be varied. This, in turn, affects the flow of coolant through the radiator since flow through the radiator is blocked when the thermostat valve is closed.

In another example, during an engine cold-start condition, a controller may close each of the first bypass shut-off valve in the first coolant loop and the second heater shut-off valve in the second coolant loop, each of the first and second coolant loops positioned between an engine and a thermostat, so as to stagnate warmer coolant at the engine while circulating cooler coolant at the thermostat. Herein, stagnating warmer coolant at the engine while circulating cooler coolant at the thermostat leads to disabling of coolant flow at the radiator. The adjusting is performed for a duration to raise a first coolant temperature of coolant stagnating at the engine above a threshold temperature while maintaining a second coolant temperature of coolant circulating at the thermostat below the threshold temperature. The duration may be based on each of an ambient air temperature, an engine speed, and a vehicle cabin heating request. Then, after the duration has elapsed, the controller may open the first valve so that coolant stagnating in the first loop is now circulated at the thermostat. Additionally, in response to a cabin heating request, the controller may open the second valve so that coolant stagnating in the second loop is now circulated at the thermostat. Herein, by circulating coolant that was previously stagnating in the second loop and/or first loop (and therefore is now sufficiently heated) at the thermostat, coolant flow at the radiator may be enabled.

In this way, by selectively exposing the temperature sensing element of a coolant temperature regulating thermostat (or thermo-fluidic thermostat valve) to heated coolant, the actual resulting coolant temperature at a point of temperature measurement (e.g., via an ECT or CHT sensor) can be affected and controlled. In other words, the cooling system's regulating coolant temperature limit may be controlled using the existing set of coolant valves. Since the temperature affected at the thermostat changes based on whether coolant is received from a first bypass loop via a bypass shut-off valve, or from a second heater loop via a heater core and a heater shut-off valve, by varying an amount of coolant circulated at the thermostat, and varying the source/origin of the circulating coolant (e.g., from bypass or heater loop), the resulting regulated coolant temperature may be changed.

Now turning to FIGS. 4-10, a plurality of diagnostic methods are depicted for confirming that the various cooling system valves, and grill shutters are functioning properly. The inventors herein have recognized that for at least some cooling system components, it may be more sensitive to run a diagnostic associated with detecting the thermal state of a cooling system component (or region) not intended to receive warm coolant than by detecting the thermal state of a cooling system component (or region) expected to receive warm coolant. For example, a thermal management diagnostic routine may be configured to determine if warm coolant is leaking out of a radiator during engine warm up, which should not be directed to the radiator during engine warm up. In this example, if an engine coolant temperature above a warm-up threshold is observed at the radiator, then it may be determined that a valve configured to flow coolant through the radiator under those conditions is not functioning properly.

As another example, a thermal management diagnostic routine may determine if warm coolant is leaking out of a transmission system during engine warm-up, which should not be directed to the transmission system during engine warm-up. In this example, if an engine coolant temperature above a warm-up threshold is observed at the transmission, then it may be determined that a valve configured to flow coolant through the transmission under those conditions is not functioning properly. As elaborated herein, to diagnose the various valves, a controller may individually close and open each of the plurality of cooling system valves to stagnate a volume of coolant in a section of the cooling system while exposing a cooling system thermostat to a remaining volume of coolant, and then diagnose each of the plurality of valves based on a change in the coolant temperature sensed at the thermostat during the individual closing and opening. As such, the bypass circuit or the heater circuit have similar temperature climb discontinuities upon initial valve opening. However, the heater circuit has more volume of coolant in it than the bypass circuit. Therefore, if pump speed goes high, before an ECT threshold is reached, then the bypass shut-off valve opens and the temperature climb discontinuity occurs. In one example, the sequentially closing may include selectively closing a first valve for a first duration while a remainder of the plurality of valves are maintained open, and after diagnosing the first valve, selectively closing a second valve for a second duration while a remainder of the plurality of valves are maintained open. Then, after diagnosing the second valve, selectively closing a third valve for a third duration while a remainder of the plurality of valves are maintained open.

As an example, diagnosing a first valve (e.g., a heater shut-off valve coupled between a heater core and the thermostat) based on the change in coolant temperature may includes diagnosing the first valve based on a change in coolant temperature over the first duration relative to a change in coolant temperature following first valve opening, and indicating degradation of the first valve if the coolant temperature rises more than a first threshold amount over the first duration and does not fall by the first threshold amount following the first valve opening. As another example, diagnosing a second valve (e.g., a bypass shut-off coupled between the engine and the thermostat in a bypass loop) based on the change in coolant temperature may include diagnosing the second valve based on a change in coolant temperature over the second duration relative to a change in coolant temperature following second valve opening, and indicating degradation of the second valve if the coolant temperature does not change more than a second threshold amount over the second duration and does not change by the second threshold amount following the second valve opening.

As still a further example, diagnosing the third valve (e.g., a transmission cooling or warming valve coupled between a radiator and a transmission oil cooler) based on the change in coolant temperature may include diagnosing the third valve based on a change in coolant temperature over the third duration relative to a change in transmission oil temperature over the third duration, and indicating degradation of the second valve if the change in coolant temperature over the third duration is less than a third threshold amount while the change in transmission oil temperature over the third duration is larger than the third threshold amount. In this way, a controller may progressively bring into circulation new circuits of cooler water in an effort to prove that the cooling system valve transitions from closed to open.

In response to an indication of no degradation of each of the plurality of cooling system valves, the controller may adjust each of the plurality of valves to stagnate hotter coolant at the engine while exposing a thermostat of the cooling system to cooler coolant.

In some embodiments, a controller may be configured to select a cooling system operating mode (at 310 and/or 316) based on the engine operating conditions, wherein each operating mode corresponds to a specific combination of cooling system valve positions. The various modes may be mapped and stored in the controller's memory, and accessed via a look-up table. The modes may be selected based on a desired cylinder head temperature (or regulated coolant temperature). A coolant temperature sensor may sense the cylinder head temperature and provide further feedback control.

For example, the cooling system may be operated in a first mode (modeA) with each of the heater and bypass shut-off valves closed. In this mode, the temperature sensing element of the thermostat may sense a stagnant coolant temperature. The resulting regulated temperature may lead to eventual overheating. However, by monitoring ECT/CHT, overheating is reduced by starting to open cooling system valves when ECT goes higher than a threshold. As another example, the cooling system may be operated in a second mode (modeB) with the heater shut-off valve open and the bypass shut-off valve closed. In this mode, the temperature sensing element of the thermostat may sense an engine oil cooler outlet temperature. The resulting regulated temperature may be higher than the thermostat setting when a lot of heat is delivered to the cabin (via the HVAC system). For example, the regulated temperature may be 250° F.

As yet another example, the cooling system may be operated in a third mode (modeC) with the heater shut-off valve closed and the bypass shut-off valve open. In this mode, the temperature sensing element of the thermostat may sense a cylinder head coolant temperature. The resulting regulated temperature may correspond to the thermostat setting (e.g., 200° F.). As still another example, the cooling system may be operated in a fourth mode (modeD) with both the heater and bypass shut-off valves open. In this mode, the temperature sensing element of the thermostat may sense a temperature that is between the engine oil cooler outlet temperature and the cylinder head coolant temperature (that is, between the temperatures sensed in modes B and C). The resulting regulated temperature may be between the thermostat settings for modes B and C, that is, between 200-250° F. For example, the thermostat setting may be 215° F.

In another example, the cooling system may be operated in a fifth mode (modeE) with the heater shut-off valve open and the bypass shut-off valve duty-cycle controlled. In this mode, the temperature sensing element of the thermostat may sense a temperature that is between the engine oil cooler outlet temperature and the cylinder head coolant temperature (that is, between the temperatures sensed in modes B and C). The resulting regulated temperature may be between the thermostat settings for modes B and C, that is, between 200-250° F. For example, the thermostat setting may be 215° F.

In a further example, the cooling system may be operated in a sixth mode (modeF) with the heater shut-off valve closed and the bypass shut-off valve duty-cycle controlled. In this mode, the temperature sensing element of the thermostat may sense a temperature that is between the stagnant coolant temperature and the engine oil cooler outlet temperature (that is, between the temperatures sensed in modes A and B). The resulting regulated temperature may be between the thermostat settings for modes A and B. For example, the thermostat setting may be 235° F.

Figure 4:
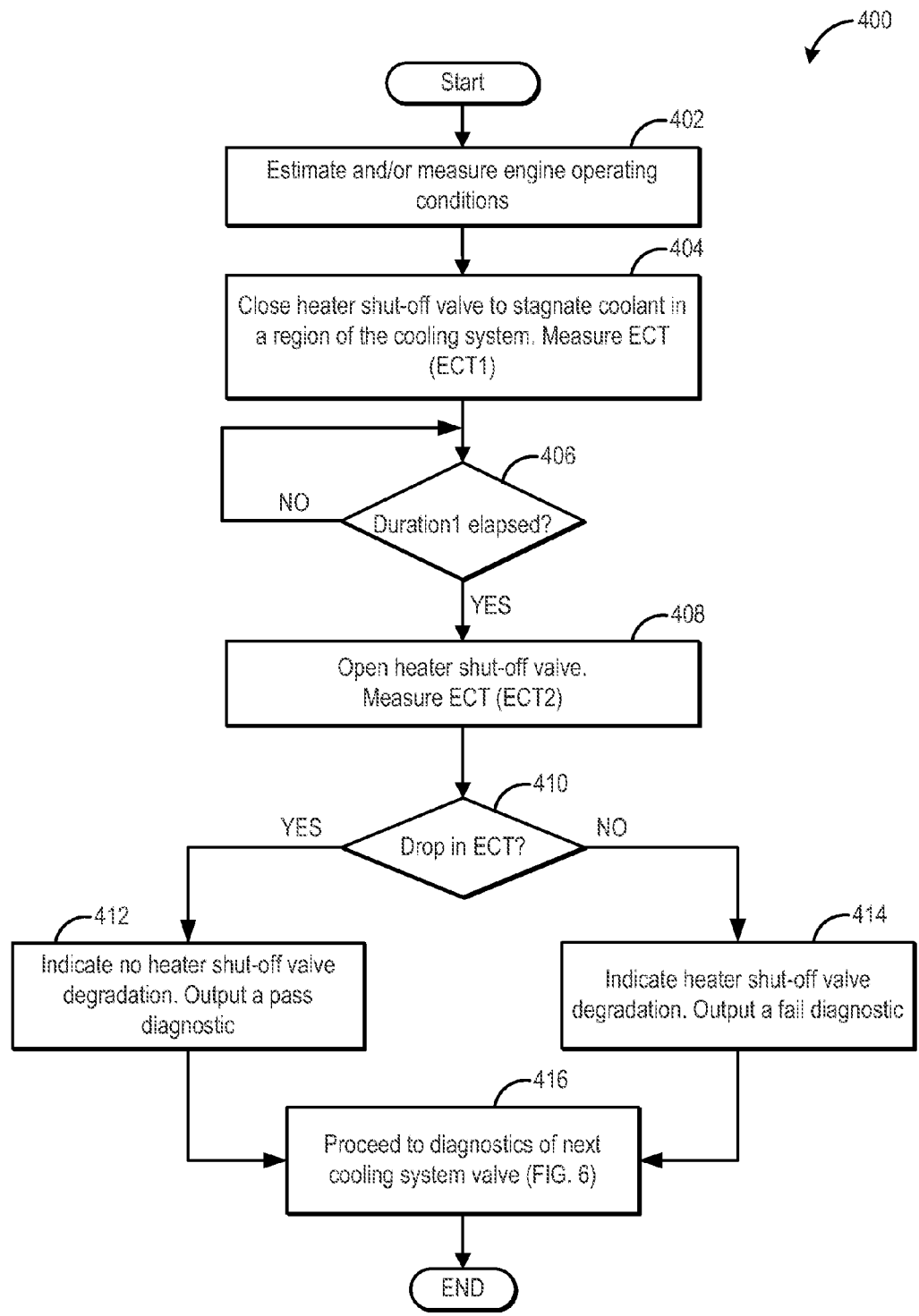
FIG. 4 shows a high level flow chart for diagnosing a heater shut-off valve of the cooling system.
Figure 5:
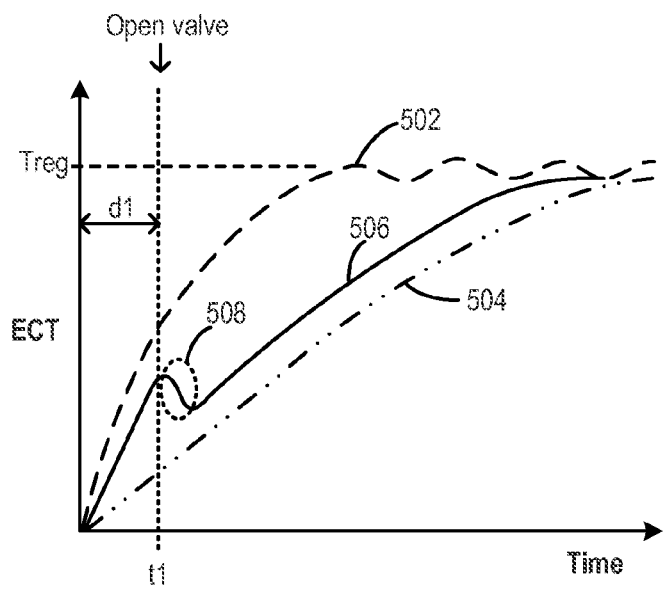
FIG. 5 shows an example thermal relationship map that may be used with the routine of FIG. 4 to diagnose heater shut-off valve degradation.

Turning now to FIG. 4, a first diagnostic routine 400 is depicted for diagnosing a heater shut-off valve of the cooling system of FIG. 2. In particular, the heater shut-off valve may be sequentially opened and closed for a duration following an engine cold-start, and a change in coolant temperature over the sequential opening and closing may be used to diagnose a condition of the heater shut-off valve.

At 402, as at 302, engine operating conditions may be estimated and/or measured. Next, at 404, the method includes closing one or more coolant system valves to stagnate a volume of coolant. Specifically, at 404, the heater shut-off valve may be closed to isolate or stagnate an amount of non-circulating coolant near a heater core region of the cooling system. Further, a first coolant temperature (ECT1) may be estimated at the onset of the diagnostic routine. For example, the first coolant temperature value may be a temperature measured by a temperature sensor associated with the coolant system. The single temperature sensor may be a sensor located near where the water gets hot, such as the cylinder head (for CHT) or in the water outlet (for ECT).

In some embodiments, the heater shut-off valve may assume a closed default position at engine shut down. In this way, the heater shutoff valve may already be closed at engine start. However, in some embodiments, the heater shut-off valve may be actuated closed at engine start, or shortly after engine start.

At 406, it may be confirmed whether a selected duration d1 has elapsed. As such, this duration d1 may correspond to a period of time over which the heater shut-off valve remains closed to allow the coolant temperature to be sufficiently raised, as described above. Upon confirmation that the specified duration d1 has elapsed, at 408, the heater shut-off valve may be opened. Additionally, a second coolant temperature (ECT2) following the opening of the valve may be estimated. For example, the second ECT value may also be a temperature measured by the temperature sensor associated with the coolant system.

It will be appreciated that while the depicted example shows confirming that a selected duration has elapsed at 406, in alternate embodiments, it may be confirmed that the coolant temperature is above a threshold temperature, or within a threshold difference from a selected engine coolant temperature or cylinder head temperature. As such, the very first time the valve in the heater circuit is opened, assuming ECT is sufficiently hot at that time, a substantially cold coolant temperature may be estimated at the thermostat and this sudden drop is characteristic that is used to confirm heater valve operation.

At 410, it may be determined if a drop in ECT has occurred. For example, if the second coolant temperature value (ECT2) is less than the first coolant temperature value (ECT1) by a threshold amount, then it may be determined that an ECT drop has occurred. However, if the second ECT value is not less than the first ECT value by the threshold amount, then it may be determined that the ECT drop has not occurred.

If an ECT drop has occurred, then at 412, no heater shut-off valve degradation may be determined, and the same may be indicted by outputting a pass diagnostic for the coolant system heater shut-off valve. Herein, the pass diagnostic may indicate that the heater shut-off valve is functional. Further, it will be appreciated that the pass diagnostic may be saved in a database of the controller.

If an ECT drop has not occurred, then at 414, heater shut-off valve degradation may be determined, and the same may be indicted by outputting a fail diagnostic for the coolant system heater shut-off valve. Herein, the fail diagnostic may indicate that the heater shut-off valve is non-functional. Further, it will be appreciated that the fail diagnostic may be saved in a database of the controller. In addition, a malfunction indication light may be illuminated to warn the vehicle operator of the failed diagnostic. After diagnosing the heater shut-off valve, the routine continues to 416, and FIG. 6, to diagnose the next cooling system valve.

As such, traditional methods for running a diagnostic on the coolant system compare a modeled ECT rate with a measured ECT rate. According to this method, when the modeled ECT warms to 20° below the thermostat's regulating temperature, the measured ECT (i.e., the actual ECT) is compared with the modeled ECT. If the actual ECT is less than the modeled ECT by a threshold amount, then the diagnostic outputs a fail response. Such a diagnostic presents an issue with leaking thermostats and early-to-open thermostats which may be indicative of a false fail diagnostic. Further, an HVAC system introduces innumerous variability that is not accounted for in the modeled ECT. For example, the modeled ECT varies greatly from the measured ECT due to an unknown cabin heating power output.

In the example illustrated at FIG. 4, the inventors have recognized that by understanding the maximum rate of ECT increase, the minimum rate of ECT increase and basing the diagnostic on a detected ECT drop, the influence of HVAC system on ECT becomes irrelevant in terms of running the thermal management diagnostic, thereby improving the accuracy and reliability of the thermal diagnostic routine.

Turning to FIG. 5, it shows an example thermal relationship map 500 that may be used with the routine of FIG. 4 to determine if the heater shut-off valve is functioning properly. Specifically, map 500 depicts a change in coolant temperature (ECT) (as sensed by the ECT or CHT sensor) over a duration when the heater shut-off valve is selectively opened and closed. By sequentially opening and closing the heater shut-off valve for a selected duration, the valve may be diagnosed based on a change in coolant temperature over the selected duration. Specifically, by looking for a temperature climb non-monotonic behavior (that us, slope of the time to temperature line) of opening of a heater shut-off valve or bypass shut-off valve, valve degradation can be determined.

As described above, the heater shut-off valve isolates a volume of coolant from circulating through the engine. Therefore, when the heater shutoff valve is closed, coolant flow through the heater core is stagnant. Consequently, a smaller volume of coolant can be warmed via heat generated by the engine, and further, via conduction with the engine block and/or cylinder head. The amount of heat transferred is also based on cabin heating demands since heat is drawn from the coolant at the heater core in response to a heating request from the operator. As a result, the coolant temperature (ECT) may increase more rapidly when no cabin heating is requested.

Map 500 of FIG. 5 depicts a maximum rate curve 502, a minimum rate curve 504, and an example measured rate curve 506. Maximum rate curve 502 may represent the maximum rate at which the ECT may increase in temperature from engine start. This temperature profile is a computed value based on fuel flow rate or the like. The gap between the maximum rate curve and minimum rate curve results from uncertainty about heat flows that are not completely known or controlled. For example, such a rate may be evident when the cabin heating system is not heating a passenger compartment (that is, cabin heating is "off"). In other words, when a passenger does not request cabin heat, then the coolant system is able to conserve heat for engine warm up, and thus the coolant temperature increases more rapidly. Further, as described above, the heater shut-off valve may be closed during engine warm up, thus maximum rate curve 502 may also represent the maximum rate at which the ECT may increase in temperature from engine start due to at least a portion of the coolant being stagnant. As shown, curve 502 approaches a regulation temperature (Treg) after some period of time. For example, once the ECT reaches the regulation temperature, the transmission warming valve, the transmission cooling valve, and/or the radiator may be utilized to control the temperature of the ECT. In this way, the ECT is maintained approximately at the regulation temperature.

Minimum rate curve 504 may represent the minimum rate at which the ECT may increase in temperature from engine start. For example, such a rate may be evident when the cabin heating system is heating the passenger compartment at a maximum rate (that is, cabin heating is "on"). For example, a blower in fluidic communication with a heater core of the cabin heating system may be set to a maximum speed, and thus the passenger compartment may receive heat that would otherwise be conserved for engine warm up. Thus, curve 504 approaches the regulation temperature at a slower rate than curve 502, as shown.

In this way, maximum rate curve 502 and minimum rate curve 504 represent the maximum limit and the minimum limit, respectively. Therefore, an actual rate of ECT warm up over time may occur somewhere between the maximum rate curve and the minimum rate curve. FIG. 5 shows example measured rate curve 506. If heat up is slower than the slowest plausible limit, then it may be inferred that some valve is leaking cold coolant into the hot coolant zone.

As shown, measured rate curve 506 includes an ECT drop indicated generally within region 508. As referred to herein, the ECT drop describes an instance in which the temperature of the ECT decreases rapidly. Such an ECT drop may coincide with actuating a valve of the coolant system. For example, the heater shut-off valve may be opened at t1 after a predetermined duration (d1) since an engine start thereby releasing a volume of relatively cooler coolant into circulation, as described above. As one example, the predetermined period of time may be two minutes after engine start; however, it will be appreciated that the heater shut-off valve may be opened at another time. Thus, the detection of the ECT drop may be used as a heater shut-off valve diagnostic tool.

It will be appreciated that while the example of FIG. 5 shows opening the valve after a time delay d1, in alternate embodiments, the valve may be opened after a temperature-based delay, wherein the valve is opened after the temperature is at or above a temperature threshold T1.

In this way, by sequentially closing and opening the heater shut-off valve and observing corresponding changes in ECT over the sequential opening and closing, a drop in coolant temperature may be used to indicate that the heater shut-off valve is functional.

Figure 6:
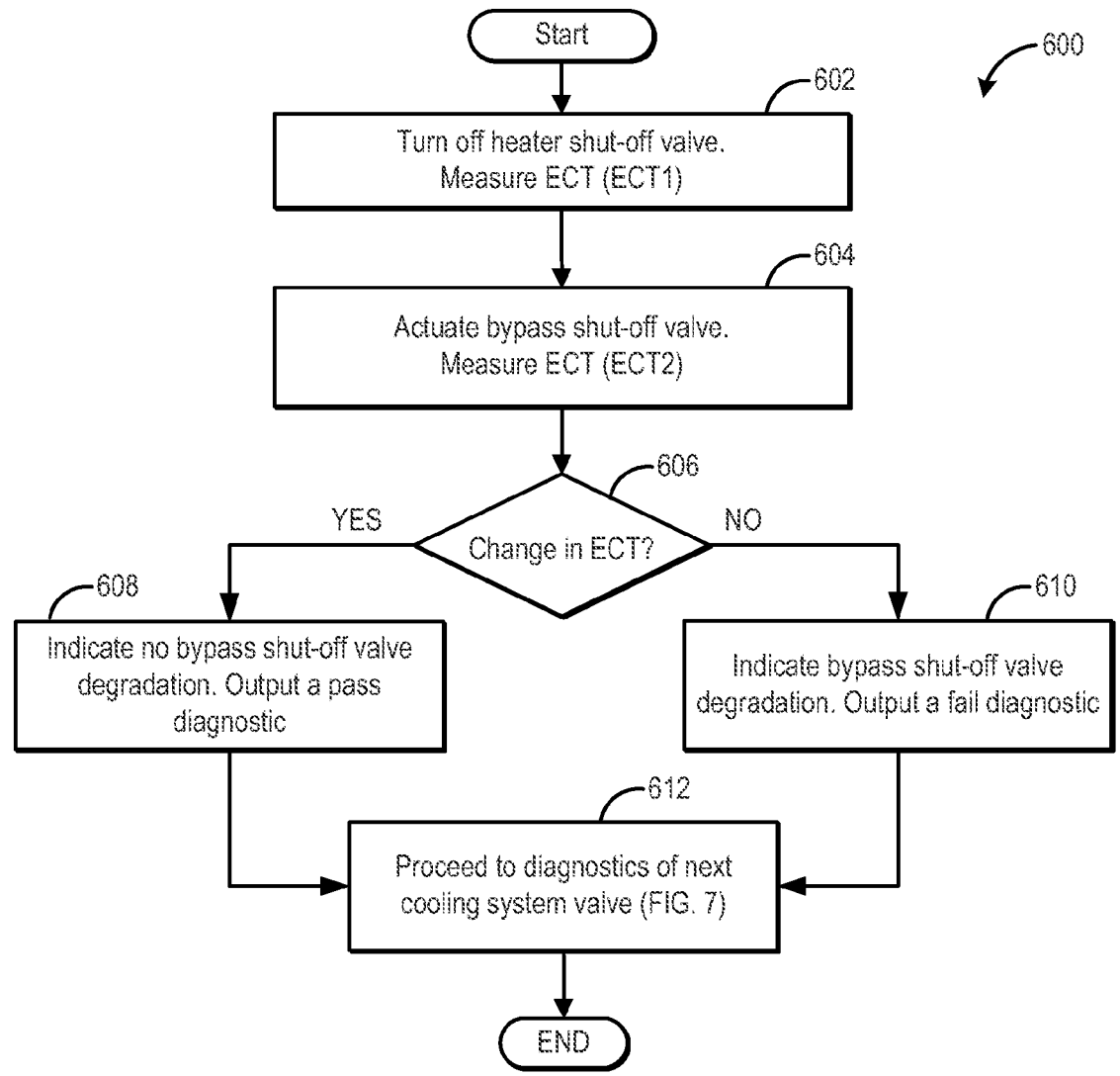
FIG. 6 shows a high level flow chart for diagnosing a bypass shut-off valve of the cooling system.

Now turning to FIG. 6, a diagnostic routine 600 is depicted for diagnosing a bypass shut-off valve of the cooling system of FIG. 2. In one example, diagnosis of the bypass shut-off valve may follow diagnosis of the heater shut-off valve. In alternate embodiments, an order of diagnosing the various cooling system valves may vary.

As described above, the bypass shut-off valve isolates a volume of coolant at the engine. Therefore, when the bypass shut-off valve is closed, coolant flow through the engine is stagnant in the first bypass loop of the cooling system. Consequently, a smaller volume of coolant can be rapidly warmed via heat generated at the engine, and further, via conduction with the engine block and/or cylinder head. Then, when the bypass shut-off valve is opened, the heated coolant may be recirculated in the cooling system and a sudden increase in the coolant temperature (at the downstream thermostat) may be observed.

Likewise, when the heater shut-off valve is closed, coolant flow through the heater core is stagnated in the first bypass loop of the cooling system. Consequently, a smaller volume of coolant can be rapidly warmed via heat generated at the engine, and further, via conduction with the engine block and/or cylinder head. Then, when the bypass shut-off valve is opened, the heated coolant may be recirculated in the cooling system and a sudden increase in the coolant temperature (at the downstream thermostat) may be observed.

The inventors have recognized that if the heater shut-off valve is turned off, actuating the bypass shut-off valve affects the regulated engine coolant temperature. However, if the bypass shut-off valve is stuck, actuating the bypass shut-off valve does not alter the regulated coolant temperature. Thus, by sequentially opening and closing each of a plurality of cooling system valves for a selected duration, and in a specified order, each valve may be diagnosed based on changes in coolant temperature over the selected duration.

At 602, the routine includes turning off the heater shut-off valve. Herein, turning off the heater shut-off valve includes turning off the related solenoid valve to thereby open the heater shut-off valve. A first coolant temperature (ECT1) may be measured at the onset of the diagnostic routine. Next, at 604, the bypass shut-off valve may be actuated for a selected duration. Herein, actuating the bypass shut-off valve includes turning on the related solenoid valve to thereby close the bypass shut-off valve. A second coolant temperature (ECT2) may be measured upon actuating the bypass shut-off valve.

At 606, it may be determined if a change in coolant temperature has occurred. Specifically, it may be determined if a drop in coolant temperature has occurred. As previously elaborated, with the heater shut-off valve turned off, actuation of the bypass shut-off valve may be expected to cause cold coolant to be sensed at the thermostat. Thus, if a decrease in coolant temperature is observed (e.g., if a difference between ECT2 and ECT1 is larger than a threshold amount), then at 608, it may be determined that no bypass shut-off valve degradation has occurred and a "pass diagnostic" output may be indicated.

In comparison, if the bypass shut-off valve is degraded, for example, stuck open, then with the heater shut-off valve turned off, actuation of the bypass shut-off valve may not change the regulated coolant temperature. Thus, if a change (e.g., drop) in coolant temperature is not observed (e.g., if a difference between ECT2 and ECT1 is smaller than a threshold amount), then at 610, it may be determined that bypass shut-off valve degradation has occurred and a "fail diagnostic" output may be indicated. In addition, a malfunction indication light may be illuminated to warn the vehicle operator of the failed diagnostic. After diagnosing the bypass shut-off valve, the routine continues to 612, and FIG. 7, to diagnose the next cooling system valve(s).

Figure 7:
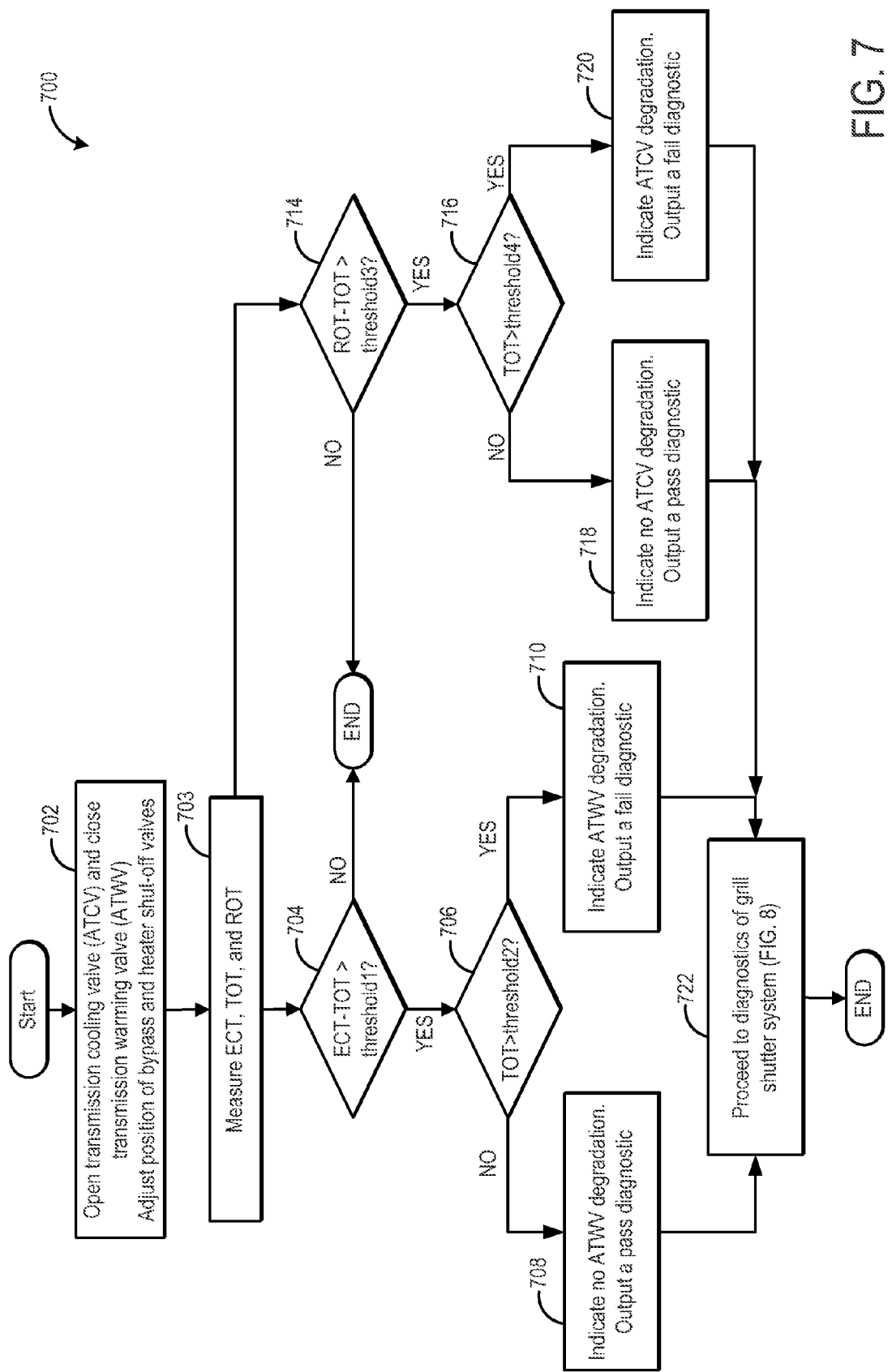
FIG. 7 shows a high level flow chart for diagnosing a transmission cooling valve and a transmission heating valve of the cooling system.

Now turning to FIG. 7, a diagnostic routine 700 is depicted for diagnosing a transmission cooling valve and a transmission warming valve of the cooling system of FIG. 2. Herein, a transmission is heated by adjusting the position of various cooling system valves to flow coolant through a first loop of the cooling system (where the first loop includes a first bypass shut-off valve) while stagnating coolant in a second loop of the cooling system (where the second loop includes a second heater shut-off valve, a heater core, a transmission warming valve, a transmission cooling valve, and a transmission oil cooler). After a transmission oil temperature has been raised by a threshold amount (that is, after a threshold amount of heat has been transferred to the transmission), degradation of a cooling system valve may be indicated based on an expected transmission oil temperature relative to an estimated transmission oil temperature. In particular, the diagnostic routine may indicate if at least one of the transmission cooling valve and the transmission warming valve is degraded.

At 702, the routine includes opening a transmission cooling valve (ATCV) of the cooling system while closing a transmission warming valve (ATWV). As such, this position of the valves disables transmission heating. In addition, a position of the first bypass shut-off valve and the second heater-shut-off valve may be adjusted to stagnate an amount of coolant in the second loop. For example, the routine may include closing the heater shut-off valve and opening the bypass shut-off valve. As a result of stagnating coolant in the second loop, the transmission may start heating. In particular, an amount of heat transferred to the transmission may be based on each of a coolant temperature, a transmission oil temperature, an engine speed, and a cabin heating request. All these parameters may affect the amount of heat lost across the heater core in the second loop, thereby affecting the amount of heat that remains in the coolant and is available for heating the transmission.

In one example, the transmission heating and subsequent diagnostic routines may be performed during an engine cold-start condition. Alternatively, the diagnostic routines may be performed during conditions when a cabin heating request is lower than a threshold (such as when there is no request for cabin heating). This ensures that less heat is lost across the heater core and more heat is available for sufficiently warming the transmission and enabling selected diagnostic conditions to be met, as elaborated below.

After adjusting the position of the valve, at 703, the method further includes measuring each of an engine coolant temperature (ECT) and a transmission oil temperature (TOT) at the transmission. Additionally, a coolant temperature at the radiator outlet (ROT) may also be determined. As such, during coolant stagnation ECT will rise as a function of engine speed, load, etc., while ROT remains relatively constant when the heater shut-off valve is closed. When the heater shut-off valve is open to flow, a relatively small amount of coolant will be able to flow through the radiator (if the transmission cooling valve is in the thermostat flow position) and it will be cooled by the radiator so that the ECT and ROT temps should track each other with ROT having a small offset lower than ECT.

Next, to diagnose the transmission warming valve, steps 704-722 may be performed. Likewise, to diagnose the transmission cooling valve, steps 714-722 may be performed. In one example, the routines for both the transmission temperature control valves may be performed simultaneously. Alternatively, the routines may be performed sequentially.

Proceeding with the routine for the transmission warming valve, at 704, it may be determined if a difference between the estimated ECT and the TOT is higher than a (first) threshold (threshold 1). If not, the routine may end. Alternatively, an indication of "no call" may be output and saved in the controller. Consequently, the diagnostic routine proceeds only if the transmission oil temperature has been raised by a threshold amount, that is, when the difference between ECT and TOT is higher than the threshold.

As such, the difference between the ECT and the TOT reflects the engine coolant to transmission fluid heat flow. In particular, the diagnostic routine is initiated upon confirming that a sufficient amount of heat has flowed in to the transmission and the transmission has been sufficiently warmed. Herein, when computing the engine coolant to transmission fluid heat flow, it is assumed that the engine coolant (that is, the transmission heatant) enters the transmission at ECT and exits the transmission at TOT. A coolant flow rate is measured a priori as a function of the engine-driven pump speed, which in turn is function of the engine speed. A heat flow rate can then be computed as follows:

$$\text{Trans\_heating\_power} = (ECT - TOT) * Sp\_heat\_of\_coolant * Coolant\_flow\_rate,$$

wherein the coolant flow rate is proportional to the engine speed.

The heat input computed using this equation is then input into a thermal model including two thermal sub-models wherein one thermal sub-model assumes that the cooling system valves are in a position to disable transmission heating (that is, with the transmission cooling valve closed to the transmission oil cooler and either heater shut-off valve closed or transmission warming valve closed), while the other sub-model uses the actual position of the valves (that is, both the heater shut-off valve and the transmission warming valve open, and the transmission cooling valve closed to the transmission oil cooler). If the difference exceeds a threshold (threshold1), then the diagnostic routine is performed.

It will be appreciated that while the thermal model discussed above determines heat flow rate into the transmission based on coolant flow rate, still other thermal models may factor in additional heat influx from various other components. For example, other models may factor in heat transfer to the transmission from torque converter slip, pump power (which is proportional to engine speed times the transmission pressure), gear losses (which are a function of torque and speed), and heat transfer from other nearby components (such as, exhaust system, catalyst, etc).

The threshold (threshold1) may reflect a sufficiently warm transmission, and a sufficient temperature difference (between ECT and TOT) to enable a reliable warm-up diagnostic test of the cooling system valve to be performed. The inventors herein have recognized that the same test may provide more reliable results during certain conditions, such as when the transmission is sufficiently warm, and less reliable results during other conditions, such as when the transmission is not sufficiently warm. For example, during conditions of high cabin heating demand, most of the coolant heat is extracted by the heater core to meet the cabin heating demand. During such conditions, the temperature difference between the ECT and the TOT may not be large enough. Consequently, cooling system valve diagnostics that are based on changes in TOT may be unreliable and error-prone. Herein, by evaluating the functionality of the valve only during conditions when the tested function is likely to provide reliable results (that is, a reliable and accurately measurable temperature difference), accuracy and reliability of the diagnostic routine can be better enabled.

Returning to the routine, after confirming that the difference between ECT and TOT is sufficiently high, at 706, it may be determined if the estimated or actual transmission oil temperature (TOT) is higher than a second threshold (threshold2). The second threshold corresponds to an expected transmission oil temperature that is determined based on engine operating conditions, such as, engine speed, load, and torque demands, and further based on cabin heating demands and ambient air temperature conditions. As an example, the threshold may be based on a position of the transmission heating valve (indicative of transmission heating demands), cabin heater fan speed (indicative of cabin heating demands), etc. If the estimated TOT is lower than (or equal to) the expected value, or threshold value, then at 708, an indication of no degradation of the transmission warming valve (ATWV) may be provided. For example, a diagnostic pass indication may be output. In comparison, if the estimated TOT is higher than the expected value, or threshold value, then at 710, an indication of degradation of the transmission warming valve (ATWV) may be provided. For example, a diagnostic fail indication may be output. In addition, a malfunction indication light may be illuminated to warn the vehicle operator of the failed diagnostic.

In this way, cooling system degradation may be indicated based on a difference between the estimated transmission temperature and the expected transmission temperature being higher than a threshold amount. After diagnosing the transmission warming valve, the routine continues to 722, and FIG. 8, to diagnose the next cooling system component. Alternatively, the routine may return to 714 to diagnose the transmission cooling valve, and after diagnosing both transmission warming and cooling valves, the routine may proceed to diagnose the next cooling system component (at FIG. 8).

Returning to the routine, to diagnose the transmission cooling valve, after opening the transmission cooling valve and closing the transmission warming valve at 702, and measuring the various temperatures at 703, the routine may proceed to 714 to confirm that a difference between radiator outlet temperature (ROT) and TOT is higher than a third threshold (threshold3). As such, during conditions when the bypass shut-off valve is open and the heater shut-off valve is closed, the engine coolant temperature estimated at the thermostat may correspond to the radiator outlet temperature. The threshold (threshold3) may reflect a sufficiently warm transmission, and a sufficient temperature difference (between ROT and TOT) to enable a reliable warm-up diagnostic test of the cooling system valve to be performed. For example, the threshold may correspond to temperature difference that is based on engine operating conditions, such as, engine speed, load, and torque demands, and further based on cabin heating demands and ambient air temperature conditions.

Upon confirming that the difference is sufficiently high, at 716, it may be determined if the estimated or actual transmission oil temperature (TOT) is higher than a fourth threshold (threshold4). The fourth threshold corresponds to an expected transmission oil temperature that is determined based on engine operating conditions and heating demands. For example, the threshold may be based on a position of the transmission cooling valve (indicative of transmission cooling demands), cabin heater fan speed (indicative of cabin heating demands), etc. If the estimated TOT is lower than (or equal to) the expected value, or threshold value, then at 718, an indication of no degradation of the transmission cooling valve (ATCV) may be provided. For example, a diagnostic pass indication may be output. In comparison, if the estimated TOT is higher than the expected value, or threshold value, then at 720, an indication of degradation of the transmission cooling valve (ATCV) may be provided. For example, a diagnostic fail indication may be output. In addition, a malfunction indication light may be illuminated to warn the vehicle operator of the failed diagnostic. After diagnosing the transmission cooling valve, the routine continues to 722, and FIG. 8, to diagnose the next cooling system component.

Herein, as with the diagnosing of the ATWV, by evaluating the functionality of the valve only during conditions when the tested function is likely to provide reliable results (that is, a reliable and accurately measurable temperature difference), accuracy and reliability of the diagnostic routine is improved.

In some embodiments, during an engine cold-start condition, in response to an indication of no cooling system degradation, a controller may further adjust the position of each the first bypass shut-off valve and the second heater shut-off valve. This may enable coolant to be stagnated in the first loop and a temperature of the engine to be further raised. Specifically, a first coolant temperature in the first loop may be raised while maintaining a second, lower temperature in the second loop. The transmission valve diagnostics will also require the heater shut-off valve to be open or duty cycled to provide coolant flow to the engine and transmission oil coolers. The coolant by-pass valve would be closed during these tests to prevent any thermal confounding.

Figure 8:
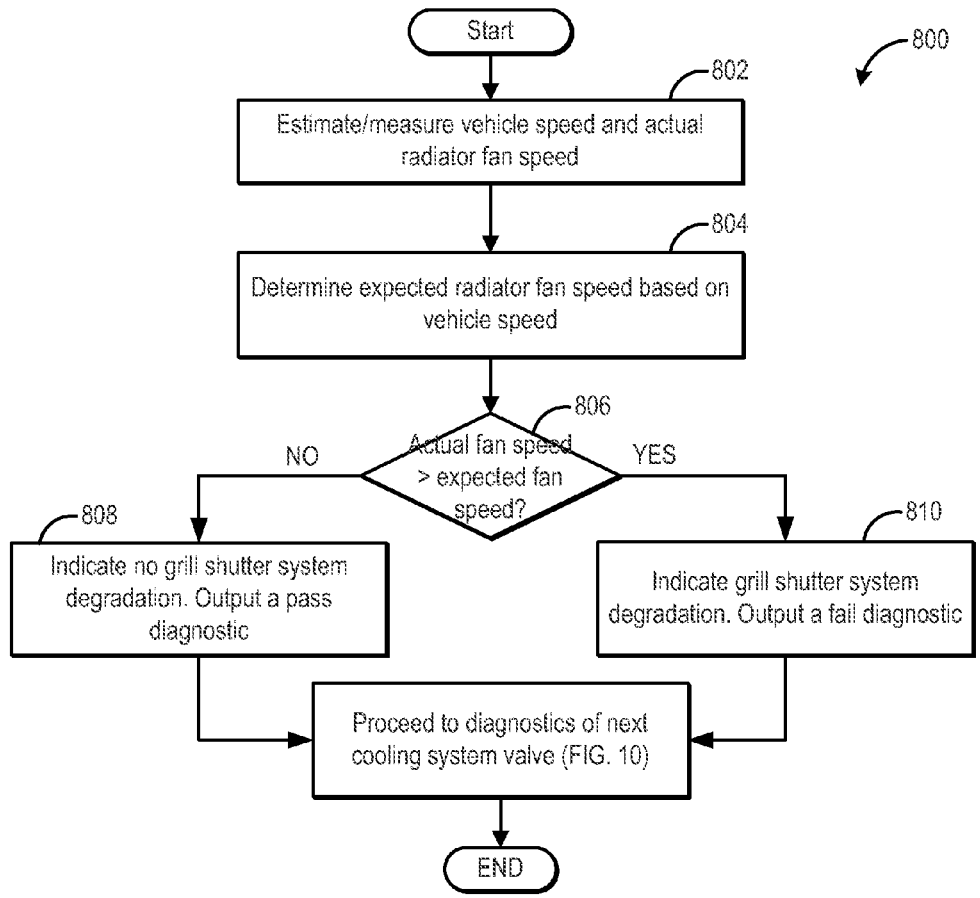
FIG. 8 shows a high level flow chart for diagnosing a grill shutter system of the cooling system.

Now turning to FIG. 8, a diagnostic routine 800 is shown for diagnosing a grill shutter system coupled to a front end of a vehicle and further coupled to the cooling system of the vehicle. To ensure optimum fuel economy and optimum cabin warming, unintentional heat losses must be reduced. As such, if the grill shutters were stuck open, there would be significant heat loss.

Since it is difficult to detect grill shutters stuck open, the routine attempts to detect grill shutters stuck closed instead. At high vehicle speeds, it may be desired to maintain the grill shutters closed for providing aerodynamic benefits and maintain the radiator fan turned off for providing electrical benefits. In comparison, at low vehicle speeds, the grill shutters are opened to lower the required fan energy. Stuck closed grill shutters end up driving the radiator fan into high speed mode when they would otherwise not be required. The method below describes a method that predicts required fan speed and compares that to an actual fan speed. Alternatively, grill shutter degradation could be determined by temporarily intrusively closing the grill shutters and noting the consequent ECT rise or the increase in fan speed.

At 802, a vehicle speed may be estimated and/or measured. In addition, an actual radiator fan speed may be measured and/or estimated. At 804, an expected radiator fan speed, or threshold speed, may be determined based on the estimated vehicle speed. At 806, it may be determined if the actual fan speed is larger than the expected fan speed (or threshold fan speed). If not, then at 808, no grill shutter system degradation may be indicated and a "pass diagnostic" may be output. In comparison, at 810, based on the radiator fan speed being larger than the expected fan speed, or threshold speed, degradation of the grill shutter system may be indicated and a "fail diagnostic" may be output. After diagnosing the grill shutter system, the routine proceeds to 812, and FIG. 10, to diagnose the next cooling system component.

An example map that may be used and referenced with the diagnostic routine of FIG. 8 is shown at FIG. 9. Map 900 therein shows an expected radiator fan speed along the y-axis relative to a change in vehicle speed along the x-axis. In the depicted example, the radiator fan speed may be represented by a fan energy required to maintain that fan speed (e.g., power, current, voltage, etc.). Line 902 depicts a graph of the fan energy required to maintain a radiator fan speed at a given vehicle speed with the grill shutters of the grill shutter system closed. Line 904 depicts a graph of the fan energy required to maintain a radiator fan speed at a given vehicle speed with the grill shutters of the grill shutter system open.

As can be seen by comparing lines 902 and 904, more radiator fan energy is required when the grill shutters are closed than when they are open. Thus, by characterizing the fan energy is both scenarios, a threshold fan speed depicted at line 906 may be determined to identify the actual position of the grill shutters. By doing this at high vehicle speeds and at crawl speeds, a more reliable threshold can be determined such that the diagnostic routine is able to reject false conclusions resulting from a trailer or a rooftop carrier increasing the vehicle's aerodynamic drag.

In some embodiments, a barometric pressure input and/or geographical location input from a GPS may also be combined to adjust the threshold. In particular, a long hill can also appear like a closed grill shutter system. Thus, by including barometric pressure and/or GPS input, false conclusions regarding the state of the grill shutter system, drawn from going up a long hill, can also be better rejected.

In this way, a controller may indicate degradation of a grill shutter system based on a speed of a radiator fan being larger than a threshold speed, wherein the threshold speed is based on a vehicle speed. The controller may further, in response to an indication of grill shutter system degradation, set a diagnostic code to indicate the degradation and record the degradation (that the grill shutter is stuck closed) in the vehicle's memory for future retrieval. The customer penalty incurred is increased fan noise and increased electrical usage. In the case of a stuck open grill shutter, the customer penalty includes loss of fuel economy due to increased aerodynamic drag and this may be recorded in the memory for future retrieval.

Now turning to FIG. 10, a diagnostic routine 1000 is shown for diagnosing a cooling system thermostat. Diagnostic routine 1000 includes a plurality of subroutines that may be used individually, or in combination, to identify thermostat degradation. In each of the sub-routines, a state of one or more cooling system valves may be adjusted to stagnate a first amount of coolant in a first loop of the cooling system while exposing a second amount of coolant to the thermostat in a second loop of the cooling system. That is, thermal differentials may be generated in different regions of the cooling system. Then, thermostat degradation may be indicated based on a difference between an actual coolant temperature (or actual coolant warm-up profile) and a threshold (or expected coolant warm-up profile), wherein the threshold (or expected profile) is based on the state of the valves. In each sub-routine, heat losses incurred from an HVAC system may be calculated differently and used to adjust the threshold or expected profile. As such, the thermostat may include a thermostat valve coupled to a temperature sensing element. Herein, one or more of the thermostat components may be degraded for a thermostat degradation to be diagnosed.

Traditional diagnostic routines for thermostats may compare a coolant warm-up profile to a minimum, or slowest warm-up profile. The slowest warm-up profile includes a warm-up profile generated when the vehicle is in a condition where maximum heat is lost to the ambient. This includes conditions of cold ambient temperatures and maximum cabin heating demanded by the operator (temperature and fan speed). If the actual warm-up profile passes the slowest warm-up profile, a thermostat diagnostic pass is output. A threshold is selected for the coldest condition where the diagnostic monitor will execute. As such, this is the condition where it is able to most reliably detect a fault in the thermostat functionality.

However, the inventors herein have recognized that while such diagnostics are reliable at cold ambient conditions, they are not very sensitive at warm ambient conditions. Thus, more reliable and accurate warm-up diagnostic routines may be required. One approach identified for making warm-up diagnostics more reliable includes measuring heat flow to a "wrong place", where heat should not flow during the selected conditions, rather than heat flow to the "right place" where heat should flow during those conditions. For example, if a radiator temperature rises before the thermostat is scheduled to open (that is, before heated coolant is supposed to reach the radiator), a degradation in the thermostat valve can be determined. That is, degradation may be more accurately identified by the presence of unintended heat gains in regions not expected to gain heat, rather than by the presence of unintended heat losses from regions that are already hot. By monitoring temperature changes near a thermostat (e.g., via a proximal temperature sensor), leaking hot coolant can be better detected.

The diagnostic sub-routines described below further compensate for heat loss variables that can lead to large variations in the coolant warm-up profile. As such, one of the largest variables in the coolant warm-up profile may be attributed to heat energy consumed or lost across a vehicle cabin HVAC system. Thus, the sub-routines of FIG. 10 enable the engine coolant warm-up model (or expected profile) to be augmented with a more accurate estimate of HVAC heat losses.

The inventors herein have also recognized that in cooling systems having a plurality of valves whereby variable coolant temperatures may be generated in different regions of the cooling system, the expected profile may need to be further adjusted based on a state of the valves, since the state of the valves affects the temperature of coolant circulating at the thermostat, and thereby the regulated coolant temperature. Thus, the sub-routines of FIG. 10 compare an estimated coolant temperature or warm-up profile to a threshold, or expected warm-up profile that is adjusted based on the state of the valves.

In other words, the routine of FIG. 10 detects internal leaks between the hot zone and cold zone of the cooling system that impede warm-up. In systems with a single valve (that is, a thermostat), the diagnosed degradation is an early-opening thermostat. In a system with multiple valves, you may not be able to pin-point the "stuck open" valve without further valve positioning or sensor data. Thus the following routine detects a valve that is open or partially open when it is supposed to be fully shut. In addition, the method of FIG. 10 infers the cabin heating, that is, the HVAC load provided via the heater core 90, thereby providing a more refined actual heater core heat loss estimate rather than a more limiting "worst case" heater loss estimate (as provided in traditional diagnostic tests). Since the radiator valve (240 of FIG. 2) is closed during the routine of FIG. 10, radiator heat losses are not estimated. As such, the diagnostic routine is run before the radiator valve 240 opens.

As such, all the routines start with a common step at 1002 including estimating and/or measuring engine operating conditions. In addition, a state of the various cooling system valves may be determined. In one example, prior to initiating the diagnostic sub-routines, a state of the various cooling system valves (e.g., bypass shut-off valve, heater shut-off valve, transmission cooling valve, and transmission warming valve) may be adjusted to stagnate a first amount of coolant in a first (bypass) loop while circulating a second (remaining) amount of coolant in a second (heater) loop, at the thermostat. This may include, for example, closing each of a heater shut-off valve, a bypass shut-off valve, and a transmission cooling valve, while opening a transmission warming valve. As another example, the order of priority may include, adjusting the valves to first deliver coolant to the heater core (if demand exists); then adjusting the valves to stagnate coolant within the engine, the stagnating coolant bypassed only as a pressure relief action due to high pump speed; then adjusting the valves to heat the transmission; and finally adjusting the valve to flow coolant to the radiator once ECT/CHT is sufficiently high.

A first sub-routine is shown at 1004 to 1044. Herein, at 1004, an ambient temperature (T_amb) is estimated. Then, at 1006, a heat loss from the vehicle's HVAC system (that is, vehicle cabin heating, ventilation, and air-conditioning system) is estimated based on engine operating conditions and the determined ambient temperature. Specifically, a heat loss though the HVAC system is determined based on the ambient temperature assuming a maximum heat transfer from the engine to the cabin (for the given ambient temperature). As such, with cabin heating turned on, and windows down, the HVAC system rejects differing amount of heat depending on the ambient temperature (the amount increasing with decreasing ambient temperature). Therefore, the HVAC heat loss is driven by the difference between the coolant temperature and the ambient temperature. Then, at 1008, an expected coolant warm-up profile is determined based on the estimated HVAC heat loss and estimated engine operating conditions (including ambient temperature). By adjusting the expected coolant warm-up profile based on a HVAC heat loss that is itself based on ambient temperature conditions, the sensitivity of the diagnostic routine is improved at all ambient air temperatures.

From here, the routine proceeds to 1040 wherein the actual profile (or actual coolant temperature at the thermostat) is compared to the expected profile (or an expected threshold). If the actual profile and the expected profiles do match, for example, if a difference between them is smaller than a threshold amount, then at 1042, no degradation of the thermostat is indicated. For example, a diagnostic pass may be output. However, if the actual profile and the expected profiles do not match, for example, if an absolute difference between them is larger than the threshold amount, then at 1044, degradation of the thermostat is indicated. For example, a diagnostic fail may be output. Additionally, a malfunction indication light may be illuminated to indicate the diagnostic fail to the vehicle operator.

In one example, indicating thermostat degradation may include indicating that a thermostat valve is stuck open when the actual/estimated coolant temperature profile is lower than the expected coolant temperature profile by larger than the threshold amount.

A second subroutine is shown at 1014-1044. Herein, at 1014, it is determined if cabin heating has been requested. For example, a state of the heater core coolant valve and/or the heater core coolant pump may be used to more accurately determine whether a vehicle occupant has commanded cabin heating. If yes, then at 1016, the HVAC heat loss is estimated based on the vehicle operating conditions (e.g., estimated during the first sub-routine at 1004) and further based on the cabin heating request. Next at 1018, the expected coolant warm-up profile is determined based on the HVAC heat loss estimated at 1016 and further based on the engine operating conditions (including T_amb). As such, if the occupant has not commanded cabin heating, the actual coolant warm-up profile may be faster and the expected warm-up profile may also be adjusted to be faster. From here, the routine proceeds to 1040 where the actual and expected coolant warm-up profiles are compared, and degradation of the thermostat is determined and indicated based on discrepancies between the profiles, as previously elaborated above.

Returning to 1014, if cabin heating is not requested, the second sub-routine may connect to the third sub-routine depicted herein at 1024-1044. As such, the third sub-routine may also be entered independently. Herein, at 1024, a passenger cabin temperature may be estimated (T_cabin). Next, at 1026, the HVAC heat loss is estimated based on the vehicle operating conditions (e.g., estimated during the first sub-routine at 1004) and further based on the cabin temperature. Specifically, the sub-routine factors in that the temperature difference between the coolant temperature and the cabin air temperature drives HVAC heat losses. Next at 1028, the expected coolant warm-up profile is determined based on the HVAC heat loss estimated at 1026 and further based on the engine operating conditions (including T_amb). From here, the routine proceeds to 1040 where the actual and expected coolant warm-up profiles are compared, and degradation of the thermostat is determined and indicated based on discrepancies between the profiles, as previously elaborated above.

A fourth sub-routine is shown at 1034-1044. As such, the fourth sub-routine may be added on to the third subroutine, with the HVAC heat loss determined using information regarding the HVAC fan speed in addition to the cabin temperature (of the third sub-routine). Alternatively, the fourth sub-routine may be entered independently. Specifically, at 1034, in addition to the cabin temperature (as estimated at 1024), an HVAC fan speed (that is, cabin heating fan speed) may be determined. Next, at 1036, the HVAC heat loss is estimated based on the vehicle operating conditions (e.g., estimated during the first sub-routine at 1004), the cabin temperature (e.g., estimated during the third subroutine at 1024) and further based on the cabin heating fan speed. Next at 1038, the expected coolant warm-up profile is determined based on the HVAC heat loss estimated at 1036 and further based on the engine operating conditions (including T_amb). From here, the routine proceeds to 1040 where the actual and expected coolant warm-up profiles are compared, and degradation of the thermostat is determined and indicated based on discrepancies between the profiles, as previously elaborated above.

In this way, an estimated coolant temperature profile sensed at a thermostat may be compared with an expected coolant temperature profile over a duration, and thermostat degradation may be determined based on a difference between the profiles being larger than a threshold amount. Herein, a more reliable expected profile may be determined based on each of a state of the plurality of cooling system valves, as well as a cabin heat loss estimate. In particular, an accurate cabin heat loss estimate may be factored in based on one or more (or each) of a cabin operator heating request, an ambient air temperature, a cabin air temperature, a cabin heater fan speed, a vehicle speed, and a coolant pump speed.

It will be appreciated that in still further embodiments, the expected coolant warm-up profile may be adjusted using a thermal model that compensates for still further salient heat losses in addition to HVAC heat losses. These may include, for example, engine compartment heat losses (e.g., losses influenced by ambient temperature, engine temperature, vehicle speed, and state/position of grill shutters) as well as transmission heat losses (e.g., losses influenced at the interface of coolant line and transmission oil cooler). For example, the engine heat loss may be estimated based on each of an engine speed, an ambient air temperature, a vehicle speed, an ignition spark timing, a radiator fan sped, and a degree of opening of the grill shutter system. Likewise, a transmission heat loss may be estimated based on the state of the plurality of cooling system valves (including a transmission warming and cooling valve) and a transmission oil temperature.

It will be appreciated that while the depicted sub-routines illustrate comparing an actual/estimated coolant warm-up profile to an expected coolant warm-up profile, in still other embodiments, thermostat degradation may be based on a rate of change in the estimated coolant temperature over a duration relative to an expected rate of change, where the expected rate of change is based on the engine operating conditions and a state of the plurality of cooling system valves.

Further still, in some embodiments, thermostat degradation may be based on a difference between a coolant temperature and a threshold, wherein the threshold is adjusted based on the state of the valves, and further based on engine speed, vehicle speed, ambient temperature, ignition spark timing, and a cabin heat loss estimate. Therein, the controller may indicate that a thermostat valve is stuck open in response to the coolant temperature being higher than the threshold while indicating that the thermostat valve is stuck closed in response to the coolant temperature being lower than the threshold.

It will be appreciated that while the sub-routines of FIG. 10 illustrate diagnosing a stuck closed thermostat valve, in alternate embodiments, diagnostic routines may be run to identify a stuck open thermostat valve. As such, a stuck open thermostat valve may show up as the coolant in the cold zone (e.g. radiator) being hotter than is supposed to be. To detect this, a radiator outlet temperature sensor (not shown) position may be used.

In some embodiments, in response to the indication of thermostat degradation, the state of the one or more cooling system valves may be further adjusted. For example, the valves may be further adjusted to increase an amount of coolant circulating at the second loop and at the thermostat, while decreasing the amount of coolant stagnating in the first loop. This may include opening each of the heater shut-off valve, bypass shut-off valve, and transmission cooling valve, while closing the transmission heating valve. During conditions where the thermostat valve is stuck closed, by forcing more coolant to circulate through the thermostat in the second loop, the thermostat valve may be opened. Herein, is the thermostat is stuck closed due to a degradation in the wax pellets, additional hot coolant flow may help to melt the wax pellets, allowing the thermostat to open.

Now turning to FIG. 11, an example routine is shown for adjusting the opening/closing state of the heater shut-off valve based on engine operating conditions. By adjusting the position of the heater shut-off valve, an amount of hotter coolant may be stagnated at the heater core while a remaining amount of cooler coolant may be circulated at the thermostat. By exposing the thermostat to lower temperature coolant, coolant flow through the radiator may be reduced, thereby lowering the regulated temperature of the circulating coolant. Then, when the heater shut-off valve is opened, the hot stagnating coolant may be circulated at the thermostat. By exposing the thermostat to warmer temperature coolant, coolant flow through the radiator may be increased, thereby changing the regulated temperature of the circulating coolant. Specifically, such an approach allows for tighter control of a regulating temperature within the hysteresis band of the mechanical thermostat. The wax pellets of the thermostat will still melt and solidify under the designed temperatures, but the valve manipulation provides some leeway into controlling the circulating coolant temperature at either end of this hysteresis band.

In particular, the routine of FIG. 11 shows the engine operating conditions under which coolant stagnation is enabled. Since the coolant by-pass valve is normally open (no coolant flow) it is the heater shut-off valve activation that provides the coolant stagnation. Stagnating coolant is intended to give us a fuel economy improvement by heating up the engine metal temperatures at a faster rate than without the stagnation. So, coolant stagnation is not allowed if the customer is requesting heat for the cabin (EATC climate head). If the vehicle is equipped with a manual climate head, then coolant stagnation is not allowed if engine coolant temperature is less than ambient (no heat increase for the cabin) or below the warm ambient threshold where one would expect a cabin heating request. Also, coolant stagnation is disallowed at high engine speeds to prevent potentially damaging high pressures in the cooling system. The EOT conditions indicate that we do not want to stagnate coolant if the engine oil is already hot. If the engine oil is cold, then we can limit engine heat transfer to the engine oil and keep the heat in the engine to improve the engine metal temperature increase rate. In addition to the fuel economy improvement generated by stagnating coolant, the engine coolant temperature can be controlled to temperatures other than that expected by the mechanical thermostat by manipulating the different valves in the system. In this way, the engine coolant temperature may be operated to a temperature other than that specified by a single mechanical thermostat.

At 1102, engine operating conditions may be estimated and/or measured. These may include, for example, engine speed, transmission oil temperature (TOT), torque, cabin heating/cooling requests, ECT, exhaust temperature, ambient conditions, etc. Based on estimated operating conditions, alone or in combination, a state of the heater shut-off valve may be adjusted.

As a first example, at 1104, it may be determined if the engine oil temperature (EOT) is higher than a threshold (Thr1). For example, it may be determined if EOT is higher than 61° C. If yes, then at 1140, the heater shut-off valve may be opened and coolant may be circulated to the engine upon passage through the heater core. Impinging of heated coolant on the thermostat valve may open the thermostat valve, enabling coolant flow through the radiator, and coolant temperature regulation. If the EOT is not higher than the threshold, then at 1144, the heater shut-off valve may be closed and coolant may be stagnated in the heater loop, at and upstream of the heater core. As another example, at 1106, it may be determined if the inner engine torque is higher than a threshold (Thr1), such as, higher than 125 Nm. The inner engine torque may be inferred from engine conditions such as engine speed, air flow, fueling, etc. If yes, then at 1140, the heater shut-off valve may be opened. Else, at 1144, it may be confirmed whether the engine speed (Ne) is higher than a threshold speed (Thr3), such as higher than 3500 rpm. If the inner engine torque is not higher than the threshold torque but the engine speed is higher than the threshold speed, then the routine proceeds to 1140 to open the heater shut-off valve. Else, if the engine speed is not higher than the threshold speed, then at 1110, it may be determined whether the exhaust temperature is higher than a threshold (Thr4), such as higher than 650° C. If yes, the heater shut-off valve is opened. Else, at 1144, the heater shut-off valve is maintained closed.

As a further example, at 1120, it may be determined if an automatic climate control unit (e.g., air conditioner of the vehicle's HVAC system) is on. In one example, the climate control unit may be on in response to a request for cabin cooling. If yes, then at 1122, it may be determined if the engine speed is higher than a threshold (Thr5), such as higher than 2500 rpm. If yes, the heater shut-off valve may be opened at 1140. Else, the heater shut-off valve may be closed at 1144.

Alternatively, after confirming that the climate control is on, at 1124, it may be determined if the engine coolant temperature (ECT), as sensed at the cylinder head, is higher than a threshold (Thr6). If yes, then the heater shut-off valve may be opened, else the valve may be closed. As such, the threshold coolant temperature above which the heater shut-off valve is opened may be based on an ambient temperature condition. This is because the heat loss across the radiator may be affected by the ambient temperature. Thus, as the ambient temperature increases, a coolant temperature at which the heater valve is opened may increase. In one example, the controller may refer to a thermal relationship map, such as the map of FIG. 12, to determine the threshold (Thr6) coolant temperature above which the heater shut-off valve is opened.

Alternatively, at 1126, it may be determined if the air conditioner is on. Herein, the air-conditioner status may be used as a surrogate to infer whether a heating demand is present. If yes, then the heater shut-off valve may be opened at 1140, else the valve may be closed.

Returning to 1120, if the climate control unit is not on, then at 1132, it may be determined if the engine speed is higher than a threshold (Thr5), such as higher than 2500 rpm. If yes, the heater shut-off valve may be opened at 1140. Else, the heater shut-off valve may be closed at 1144.

Alternatively, after confirming that the climate control is on, at 1134, it may be determined if the engine coolant temperature (ECT), as sensed at the cylinder head, is higher than a threshold (Thr6). If yes, then the heater shut-off valve may be opened, else the valve may be closed. As previously elaborated, the threshold coolant temperature above which the heater shut-off valve is opened may be based on an ambient temperature condition, for example, based the thermal relationship map of FIG. 12.

As another example, at 1136, it may be determined if the air conditioner is on. Herein, the air-conditioner status may be used as a surrogate to infer whether a heating demand is present. If yes, then the heater shut-off valve may be opened at 1140, else the valve may be closed.

Following opening of the heater shut-off valve at 1140, the valve may be maintained open until selected conditions are met at 1142. These include, for example, confirming that the inner engine torque is less than a threshold (e.g., less than 125 Nm), an exhaust temperature is less than a threshold (e.g., less than 650° C.), an engine oil temperature is less than a threshold (e.g., less than 56° C.), engine speed is less than a threshold (e.g., less than 2200 rpm), coolant temperature is less than a threshold (e.g., less than a threshold based on the current ambient temperature), and no request has been received from the operator for cabin heating. As such, all of the above conditions may need to be confirmed for the selected conditions to be considered met. When the selected conditions are met, the routine may proceed to 1144 to close the heater shut-off valve.

Herein, by adjusting a position of the heater shut-off valve based on one or more engine operating conditions, a coolant temperature at the heater core may be advantageously used to provide cabin heating/cooling, for expediting engine warm-up and/or transmission warm-up, and without unnecessarily dissipating heat across the radiator.

In this way, by adjusting the position of one or more cooling system valves, thermal differentials may be created in different regions of the cooling system. Specifically, by stagnating at least some coolant at the engine block and circulating the remaining coolant at the thermostat, a temperature of coolant circulating at the thermostat may be varied, thereby affecting the resulting regulated coolant temperature. By doing so, a variable and controllable engine coolant temperature may be achieved by using the existing set of cooling system valves. By using the same temperature differentials to identify cooling system valve degradation, the accuracy and reliability of cooling system diagnostics may be improved. By enabling variable engine coolant temperature control, coolant temperature regulation may be improved. In addition, fuel economy and engine performance advantages may be achieved.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
    during an engine cold-start,
    closing a heater shut-off valve while maintaining all remaining cooling system valves open to stagnate a volume of coolant in a section of the cooling system for a duration;
    opening the heater shut-off valve after the duration; and
    indicating degradation of the heater shut-off valve based on a first coolant temperature estimated before the closing relative to a second coolant temperature estimated after the opening.

2. The method of claim 1, wherein stagnating a volume of coolant in a section of the cooling system includes stagnating the volume of coolant near a heater core region of the cooling system.

3. The method of claim 1, wherein the heater shut-off valve assumes a closed default position at engine shutdown and wherein closing the heater shut-off valve during the engine cold-start includes restarting the engine with the heater shut-off valve already closed.

4. The method of claim 1, wherein the duration is based on each of vehicle cabin heating demanded by an operator, engine speed, and ambient air temperature.

5. The method of claim 1, wherein the duration corresponds to a period of time that allows the first coolant temperature to be raised above a threshold temperature.

6. The method of claim 5, wherein indicating degradation includes,
    if the second coolant temperature is less than the first coolant temperature by at least a threshold amount, indicating no heater shut-off valve degradation; and
    if the second coolant temperature is not less than the first coolant temperature by the threshold amount, indicating heater shut-off valve degradation.

7. The method of claim 1, wherein each of the first and second coolant temperatures are estimated by a temperature sensor associated located at a water outlet of the cooling system.

8. The method of claim 1, wherein each of the first and second coolant temperature are sensed at a thermostat of the cooling system.

9. The method of claim 1, wherein maintaining all remaining cooling system valves open includes maintaining each of a bypass shut-off valve, a transmission cooling valve, and a transmission warming valve open.

10. The method of claim 9, further comprising, after diagnosing the heater shut-off valve, diagnosing the bypass shut-off valve.

11. The method of claim 10, wherein the heater shut-off valve is located between a heater core and the thermostat of the cooling system, and wherein the bypass shut-off valve is located between the engine and the thermostat in a bypass loop of the cooling system.

12. The method of claim 1, wherein the engine is coupled to a vehicle, the method further comprising, indicating degradation of a grill shutter system coupled to the cooling system based on a radiator fan speed being larger than a threshold speed, the threshold speed based on a vehicle speed.

13. A method for a vehicle, comprising:
    during an engine cold start,
    closing a heater shut-off valve of an engine cooling system for a duration,
    then actuating a bypass shut-off valve closed; and
    indicating degradation of the bypass shut-off valve based on a first coolant temperature estimated before closing the heater shut-off valve relative to a second coolant temperature estimated after actuating the bypass shut-off valve.

14. The method of claim 13, wherein the duration is based on each of a vehicle cabin heating demanded by an operator engine speed, and ambient air temperature.

15. The method of claim 13, wherein the duration corresponds to a period of time that allows the first coolant temperature to be raised above a threshold temperature.

16. The method of claim 13, wherein indicating degradation includes,
    if the second coolant temperature is less than the first coolant temperature by at least a threshold amount, indicating no bypass shut-off valve degradation; and
    if the second coolant temperature is not less than the first coolant temperature by the threshold amount, indicating bypass shut-off valve degradation.

17. The method of claim 13, wherein each of the first and second coolant temperature are sensed at a thermostat of the cooling system.

18. The method of claim 13, wherein the heater shut-off valve is coupled between a heater core and a thermostat in a heater loop of the cooling system while the bypass shut-off valve is coupled between the engine and the thermostat in a bypass loop of the cooling system, and wherein each of a transmission cooling valve and a transmission warming valve coupled in a transmission loop of the cooling system are maintained open during the actuating.

19. A vehicle system, comprising:
    an engine;
    a transmission coupled to a transmission oil cooler;
    a grill shutter system coupled to a front end of the vehicle;
    a heater core configured to provide heat to a vehicle passenger cabin;
    a radiator including a fan;
    an engine cooling system configured to circulate coolant, via a plurality of coolant loops and valves, around each of the engine, the transmission oil cooler, the heater core, and the radiator based on a coolant temperature sensed at a thermostat of the cooling system; and
    a controller with computer readable instructions for,
    during an engine cold start,
    selectively closing one of a plurality of cooling system valves while maintaining all remaining valves open to stagnate a smaller volume of coolant between the engine and the closed valve for a duration until a first engine coolant temperature estimated before the selective closing is above a threshold temperature; and
    after the duration, opening the valve and indicating degradation of the valve based on the first coolant temperature relative to a second coolant temperature estimated after the opening.

20. The system of claim 19, wherein the indicating includes indicating degradation of the valve if the second coolant temperature is not less than the first coolant temperature by a threshold amount, and further indicating that the valve is stuck open.

* * * * *